United States Patent [19]
Hartung et al.

[11] Patent Number: 5,920,709
[45] Date of Patent: Jul. 6, 1999

[54] BUS INTERFACE FOR IDE DEVICE

[75] Inventors: Steven F. Hartung; Marek Joseph Marasch; Neal Foxworthy; Jack S. Bakeman, Jr., all of Boulder, Colo.

[73] Assignee: Exabyte Corporation, Boulder, Colo.

[21] Appl. No.: 08/751,681

[22] Filed: Nov. 18, 1996

Related U.S. Application Data

[60] Provisional application No. 60/018,914, Jun. 4, 1996.

[51] Int. Cl.$^6$ .................................................. G06F 13/40
[52] U.S. Cl. ........................ 395/309; 395/306; 395/311; 395/280; 395/283
[58] Field of Search ............................ 704/273; 395/653, 395/280, 309, 283, 306, 311

[56] References Cited

U.S. PATENT DOCUMENTS

| | | | |
|---|---|---|---|
| 5,040,993 | 8/1991 | Krug et al. . | |
| 5,239,445 | 8/1993 | Parks et al. . | |
| 5,295,247 | 3/1994 | Change et al. | 395/325 |
| 5,310,998 | 5/1994 | Okuno . | |
| 5,454,080 | 9/1995 | Fasig et al. . | |
| 5,473,499 | 12/1995 | Weir . | |
| 5,483,419 | 1/1996 | Kaczeus, Sr. et al. | 361/685 |
| 5,526,493 | 6/1996 | Shu . | |
| 5,535,419 | 7/1996 | O'Brien | 395/856 |
| 5,544,334 | 8/1996 | Noll | 395/309 |
| 5,581,715 | 12/1996 | Verinsky et al. | 395/309 |
| 5,581,716 | 12/1996 | Park . | |
| 5,604,873 | 2/1997 | Fite et al. . | |
| 5,685,012 | 11/1997 | Klein | 395/834 |
| 5,691,926 | 11/1997 | Cannon et al. | 364/579 |
| 5,768,612 | 6/1998 | Nelson | 395/800.32 |

*Primary Examiner*—Glenn A. Auve
*Assistant Examiner*—Eric S. Thlang
*Attorney, Agent, or Firm*—Nixon & Vanderhye, P.C.

[57] ABSTRACT

An interface apparatus or Nest (30) fits into a peripheral slot (24) connected to an IDE bus (60) of a host computer. IDE devices, such as magnetic tape drives and hard drives, are hot swapable in and out of Nest (30) while the IDE bus is active. The Nest isolates the IDE device from the active IDE bus until such time (e.g., initialization of the IDE device) as connection of the IDE device to the IDE bus will not corrupt the IDE bus, after which time the Nest connects the IDE device to the IDE bus while the IDE bus is active. A nest driver (230) is executed for computer systems (200) which tend to establish a permanent inventory of IDE devices upon system boot-up. The nest driver determines whether a Nest is connected to the host; determines whether an IDE device has been inserted in the Nest; and determines when the IDE device in the Nest has been initialized. After device initialization, the nest driver (1) opens the Nest so that the IDE device is connected to the IDE bus and the Nest becomes transparent to the host; (2) queries the IDE device installed in the Nest to determine its device type, and thereafter (3) reenumerates a dynamic device database maintained by the operating system of the host.

37 Claims, 16 Drawing Sheets

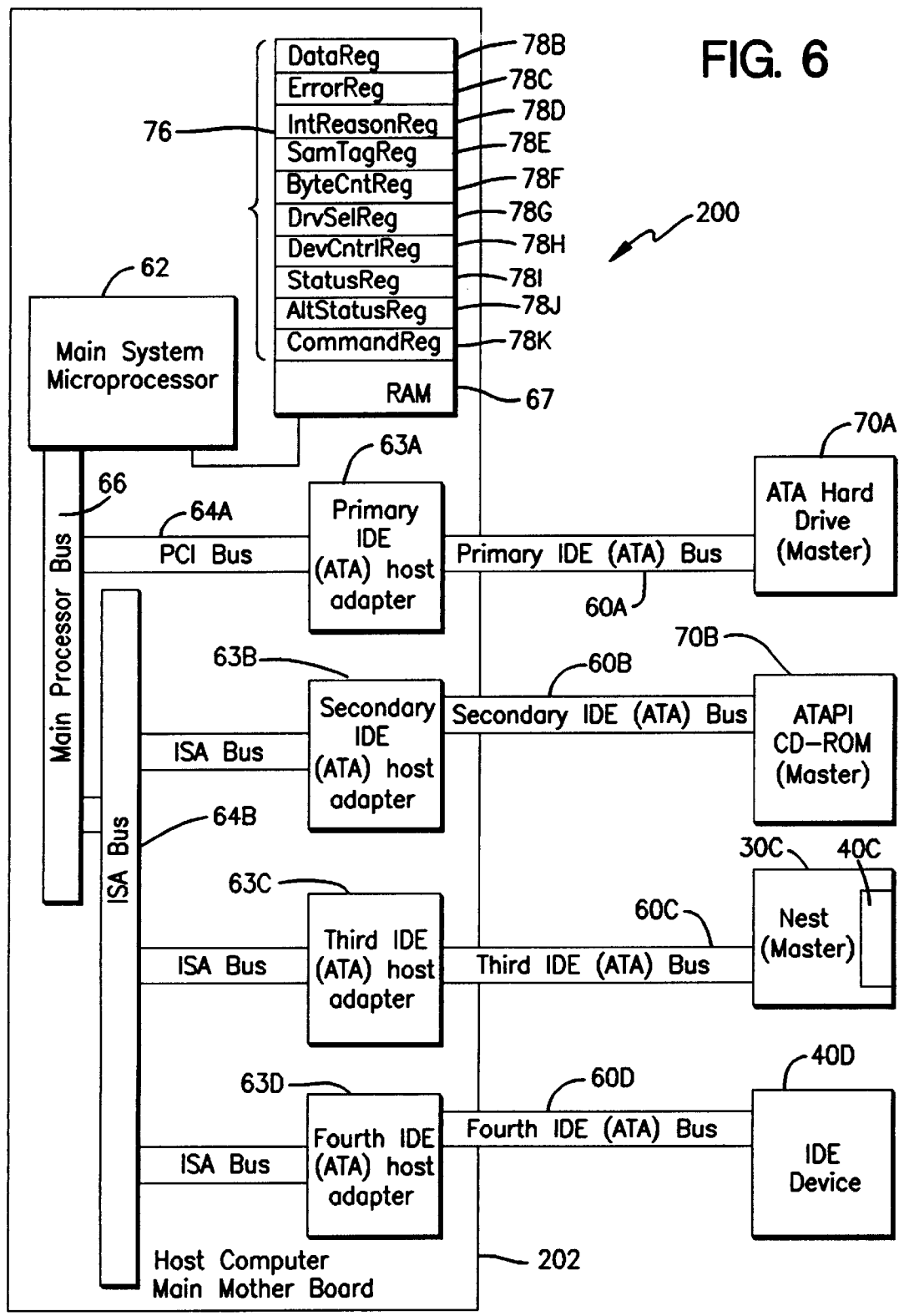

Microsoft's Windows 95 Operating System

5,920,709

BUS INTERFACE FOR IDE DEVICE

This application claims benefit and priority of U.S. provisional patent application Ser. No. 60/018,914 filed Jun. 4, 1996.

BACKGROUND

1. Field of Invention

This invention pertains to the interfacing of peripheral computer equipment to a bus of a host computer.

2. Related Art and Other Considerations

Computer systems typically have a bus which forms e.g. a connection between the computer's processor and a peripheral device, such as a storage type. One type of bus is configured to operate under either an ATA (AT-attachment) or ATAPI (ATA Packet Interface) protocol, and is accordingly known as an IDE (Integrated Device/Drive Electronics) or ATA/ATAPI peripheral bus. The operation of ATA/ATAPI peripheral bus is understood with resort to such documents as ANSI X3T9 document "AT Attachment Interface with Extensions (ATA-2)" [defining the peripheral bus interface], and the Small Form Factor Committee document "ATA Packet Interface for CD-ROMs SFF-8020i" [defining the ATAPI device protocol].

Presently, an IDE bus can handle up to two ATA/ATAPI devices (e.g., two storage devices). Of the two ATA/ATAPI devices, one device must be considered a "master"; the other must be considered a "slave".

Connecting a device to an active IDE bus can corrupt data flow on the bus and crash the entire computer system. What is needed is a safe way to connect a device to an active IDE bus. Other problems exist when the IDE bus expects to have a device connected to it, but does not. In some instances it would be advantageous to emulate connection of a device to an IDE bus when no such device is connected.

SUMMARY

An interface apparatus or Nest fits into a peripheral slot connected to an IDE bus of a host computer. IDE devices, such as magnetic tape drives and hard drives, are hot swapable in and out of the Nest while the IDE bus is active without degrading the IDE bus. The Nest isolates the IDE device from the active IDE bus until such time (e.g., initialization of the IDE device) as connection of the IDE device to the IDE bus will not corrupt the IDE bus, after which time the Nest connects the IDE device to the IDE bus while the IDE bus is active. The Nest includes an initializer for initializing a master/slave status of the IDE device; an insertion/removal detector which detects whether the IDE device is inserted into the Nest; a gate which selectively connects the IDE bus with the IDE device; and, a set of registers for storing information indicative of a current state of the IDE bus. When the IDE device is connected to the IDE bus, the contents of the set of registers is loaded into a task file of the IDE device. After the IDE device is connected to the IDE bus, the Nest continues to monitor the status of the IDE bus with the set of registers in the Nest serving as a phantom task file corresponding to the device task file.

The Nest is utilizable with differing types of operating systems. A nest driver is executed by the microprocessor of the host for computer systems which tend to establish a permanent inventory of IDE devices upon system boot-up. The nest driver determines whether a Nest is connected to the host; determines whether an IDE device has been inserted in the Nest; and, determines when the IDE device in the Nest has been initialized. After device initialization, the nest driver (1) opens the Nest so that the IDE device is connected to the IDE bus and the Nest becomes transparent to the host; (2) queries the IDE device installed in the Nest to determine its device type, and thereafter (3) reenumerates a dynamic device database maintained by the operating system of the host.

The Nest driver resides in and is executed in a first ring of the operating system of host computer. To reenumerate the dynamic device database, the Nest driver schedules execution of at least a portion of itself in a second ring of the operating system for the purpose of removing, during a time of execution of the second ring, a node of the dynamic device database which is a parent to the IDE device which as been connected or disconnected to the Nest. Thereafter the driver requests at least a partial inventory of the computer system in order to reenumerate the database.

In a further embodiment, the Nest includes a microprocessor which is capable of responding to set of ATAPI commands, including ATAPI commands to which response is required prior to booting up of the Nest driver.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a schematic view showing connection of an an interfacing device (Nest) according to the invention with a computer system having a second type of operating system.

DETAILED DESCRIPTION OF THE DRAWINGS

Figure 1:
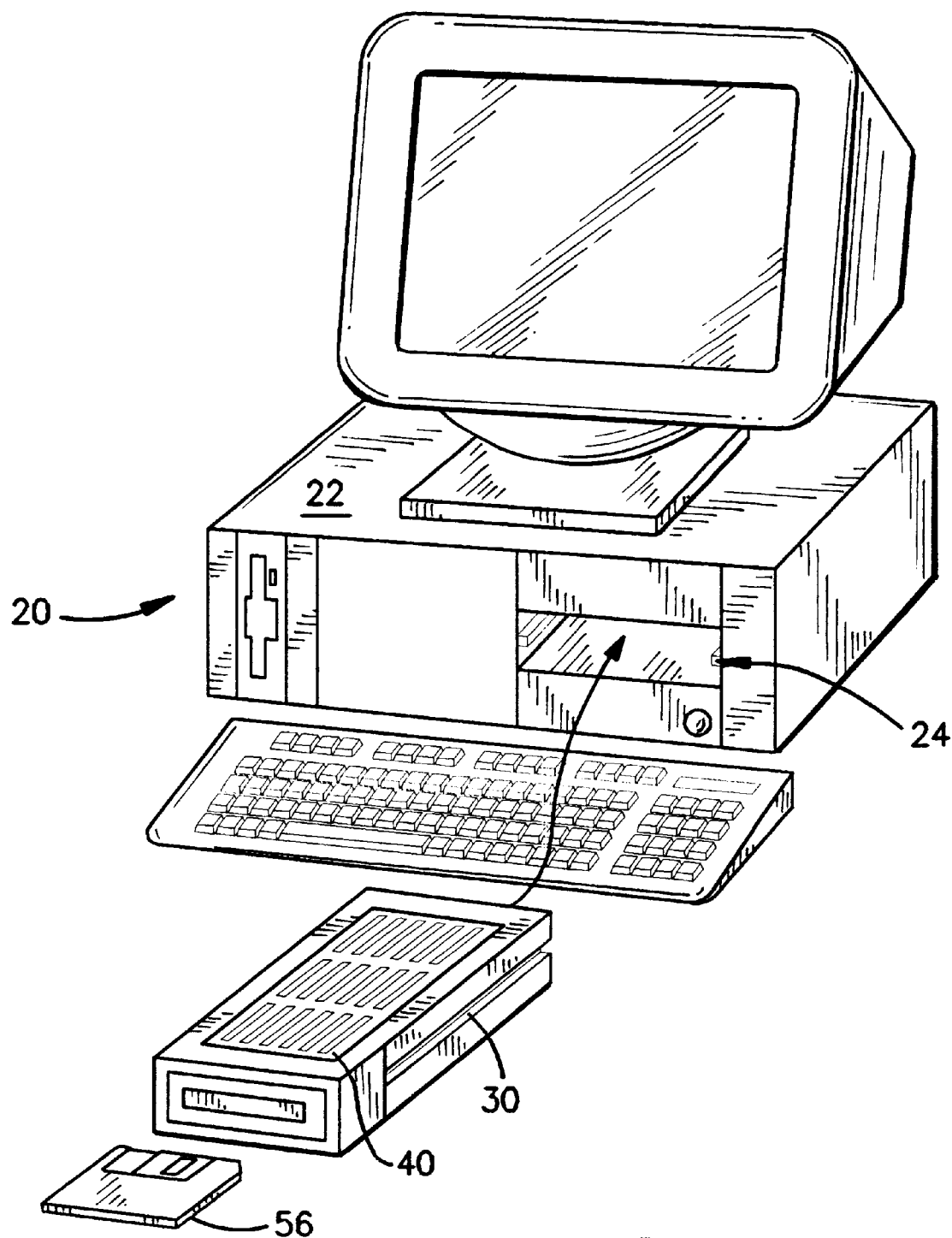
FIG. 1 is a perspective view of a computer system including a slot in which an interfacing device (Nest) of the present invention resides.

FIG. 1 shows a (host) computer system 20, including a computer housing 22 provided with a slot 24 of a type which conventionally receives a 5¼ inch form factor peripheral. Rather than receiving a peripheral, however, slot 24 receives an interfacing device or Nest 30 according to embodiments of the present invention.

Figure 2:
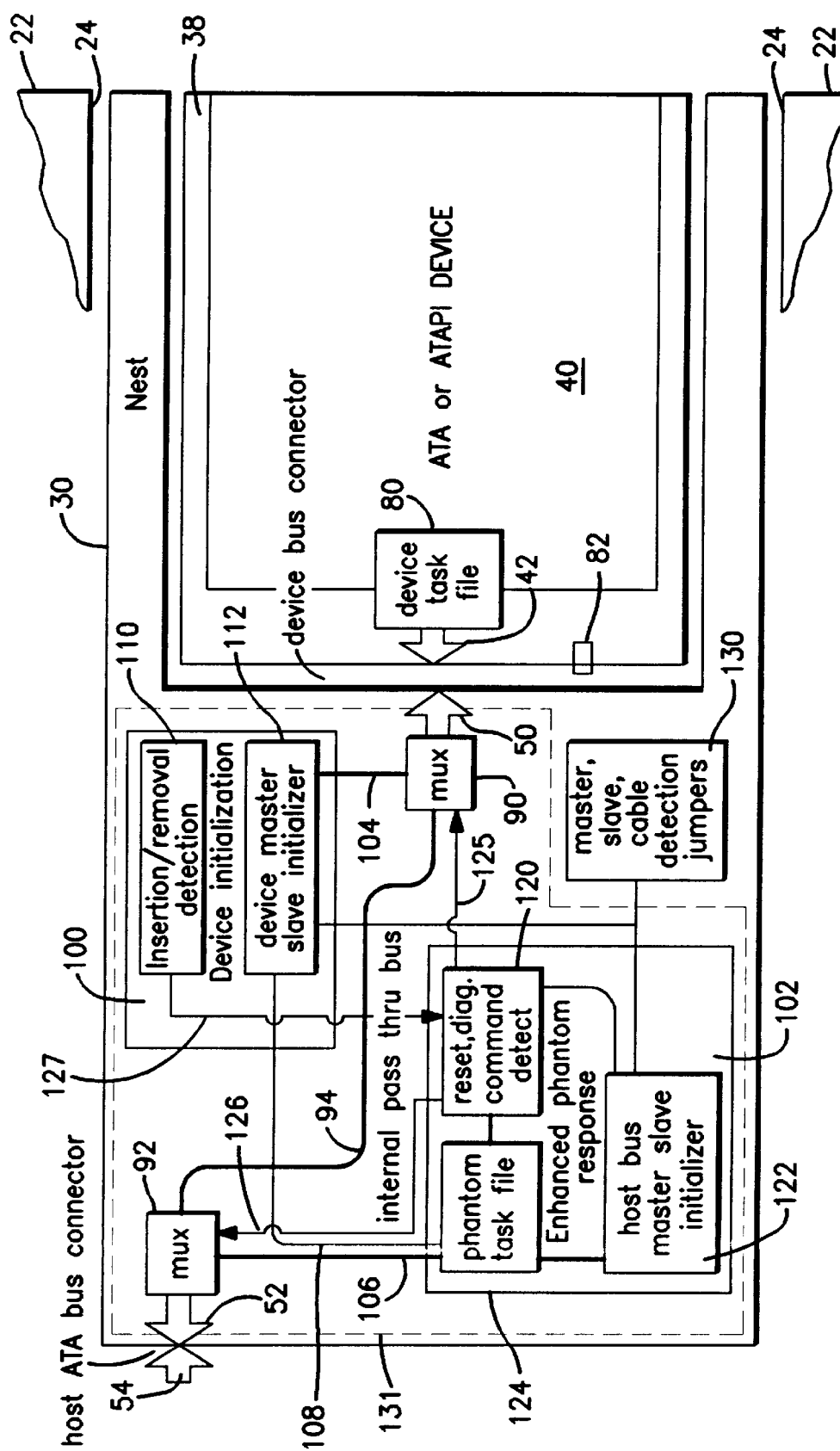
FIG. 2 is a schematic view of an interfacing device (Nest) according to an embodiment of the present invention.

As shown in FIG. 1 and FIG. 2, Nest 30 fits into slot 24 of computer housing 22. As shown in both FIG. 2 and FIG. 3, Nest 30 has an internal bay 32 which receives a carrier 38 for an ATA or ATAPI device 40. At the rear of bay 32 is an IC circuit board 34 which carries, on its device-facing side, a nest-to-device connector 50. A connector 42 on device 40 (or carrier 38) mates with a nest-to-device connector 50 of Nest 30. A nest-to-host connector 52 electrically connects Nest 30 to an ATA/ATAPI (IDE) connector 54 of computer system 20.

Figure 3:
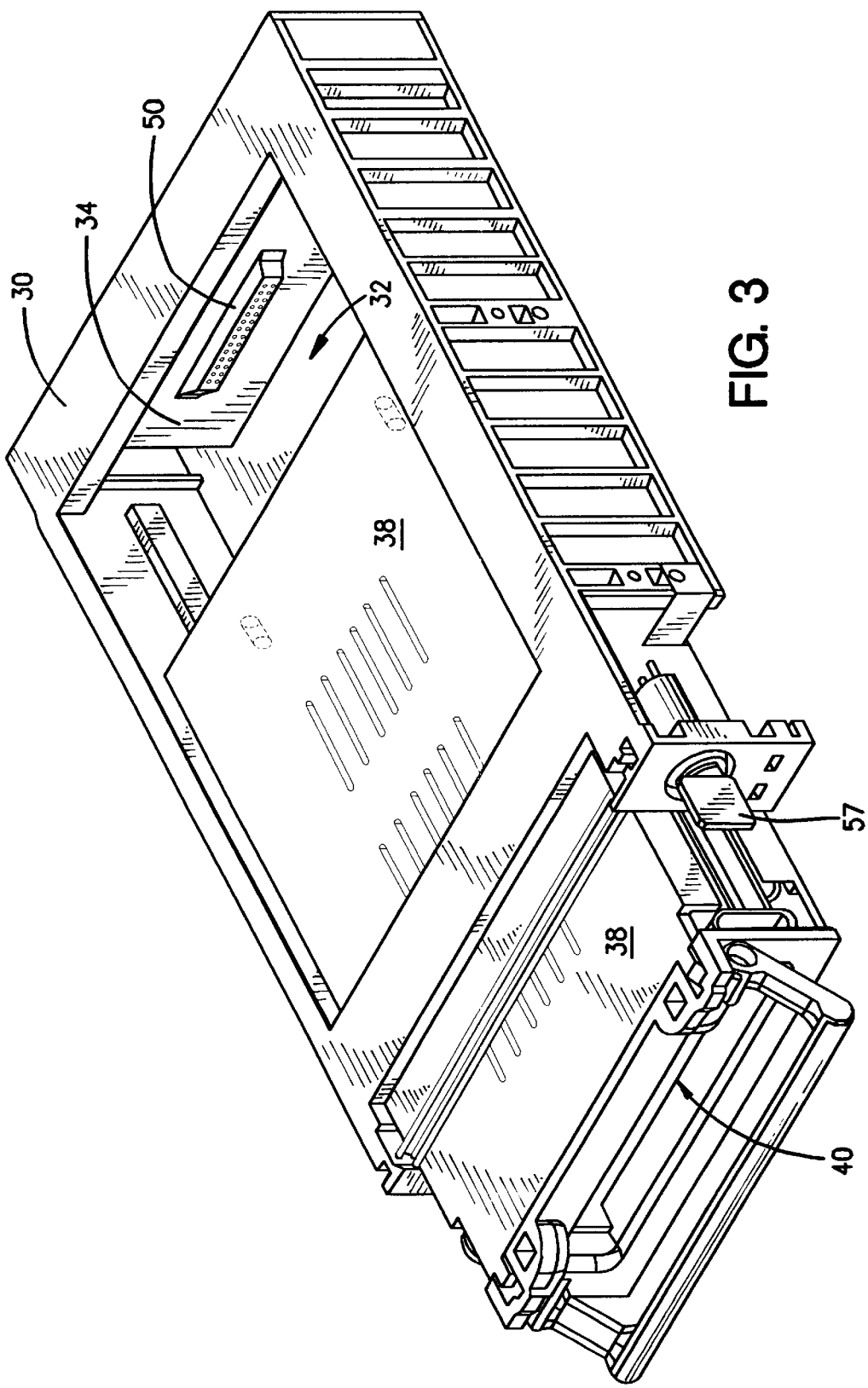
FIG. 3 is a perspective view of an interfacing device (Nest) according to an embodiment of the present invention.

Device 40 can be any storage device, such as a tape drive, a hard drive, or a removable disk, for example. In the embodiment of FIG. 3, device 40 is shown as being a tape drive (shown as receiving a tape cartridge 56 in FIG. 1), although it is reiterated that other types of devices can instead be utilized.

When carrier 38 is fully inserted into internal bay 32 of Nest 30, a locking key 57 can be actuated. Actuation of locking key 57 completes an electrical connection to IC board 34. Completion of the electrical connection is detected by Nest 30 as being indicative of insertion of device 40 into bay 32.

Figure 4:
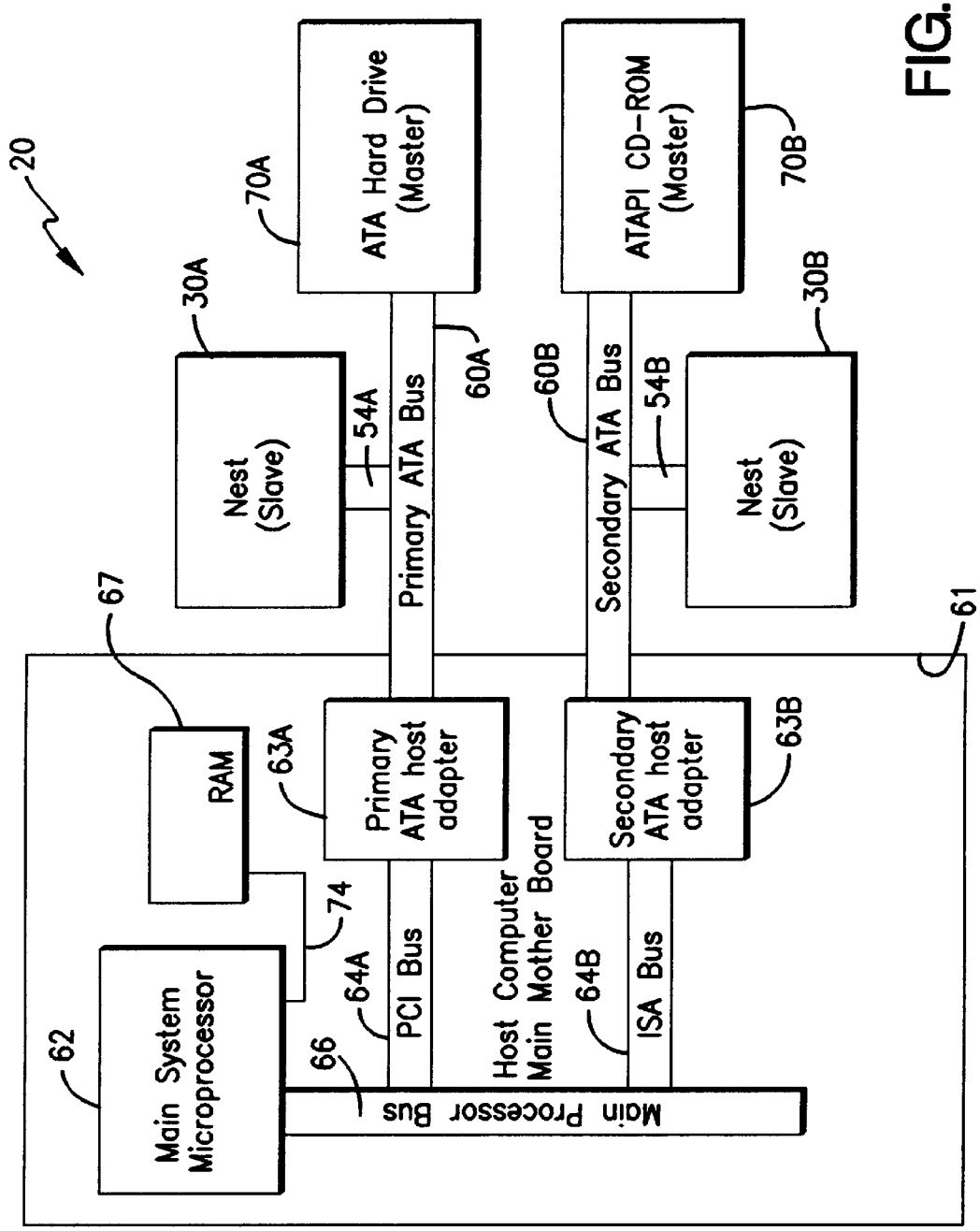
FIG. 4 is a schematic view showing connection of re an interfacing device (Nest) according to the invention with a computer system having a first type of operating system.

FIG. 4 shows an example of a first type of computer system 20 with which a Nest 30 of the present invention can be utilized. Computer system 20 of FIG. 4 with which the Nest 30 can be utilized has a DOS or Windows 3.x operating system on an IBM AT-compatible DOS system. Computer system 20 of FIG. 4 actually has two nests, labeled as Nests 30A and 30B in FIG. 4. ATA/ATAPI connector 54A of Nest 30A is connected to ATA/ATAPI peripheral bus 60A.

The host of computer system 20 of FIG. 4 has a motherboard 61 on which reside main processor 62, primary ATA host adapter 63A, secondary ATA host adapter 63B, PCI bus 64A, ISA Bus 64B, main processor bus 66, and Random access memory (RAM) 67. Random access memory (RAM) 67 of computer system 20 of FIG. 4 is connected to microprocessor 62 by data and address busses collectively represented as bus 74. ATA/ATAPI peripheral bus 60A is ultimately connected to the processor 62 of host computer 20 via ATA host adapter 63A, PCI bus 64A, and main processor bus 66. Another ATA/ATAPI device, particularly device 70A (an ATA Hard Drive), is also shown as being connected to ATA/ATAPI peripheral bus 60A.

Similarly, ATA/ATAPI connector 54B of Nest 30B is connected to ATA/ATAPI peripheral bus 60B. ATA/ATAPI peripheral bus 60B is ultimately connected to processor 62 via ATA host adapter 63B, ISA bus 64B, and main processor bus 66. Another ATA/ATAPI device, particularly device 70B (an ATAPI CD-ROM), is also shown as being connected to ATA/ATAPI peripheral bus 60B.

It should be understood that Nest 30 of the present invention can be utilized in a system having a differing number of nests, such as one nest, for example. Accordingly, as used hereinafter, "ATA/ATAPI peripheral bus 60" or "ATA bus 60" can refer to any ATA/ATAPI peripheral bus included in a system architecture which is appropriate for the utilization situation of the Nest 30.

Device 40, housed in carrier 38 which is received in bay 32 of Nest 30, is shown in FIG. 2 as having a device task file 80, in accordance with ATA/ATAPI protocol requirements. In device task file 80 are a set of device registers, including the following: DataReg; ErrorReg; IntReasonReg; SamTagReg; ByteCntReg; DrvSelReg; DevCntrReg; StatusReg; AltStatusReg; and, CommandReg. In addition, device 40 has a jumper 82 whereby device 40 can be configured as a master, slave, or as cable select for ATA/ATAPI protocol.

Nest-to-device connector 50 of Nest 30 is connected to a device side multiplexer (MUX) 90. Nest-to-host connector 52 is connected to a host side multiplexer (MUX) 92. Nest bus or internal pass through bus 94 extends between device side multiplexer (MUX) 90 and host side multiplexer (MUX) 92.

In the particular embodiment illustrated in FIG. 2, Nest 30 includes two machines—a device initialization (DI) machine 100 and an enhanced phantom response and negotiation (EPRAN) machine 102. DI machine 100 is connected to MUX 90 via DI bus 104; EPRAN machine 102 is connected to MUX 92 via EPRAN bus 106. In the illustrated embodiment, DI machine 100 and EPRAN machine 102 are both state machines which communicate with each other via machine communication bus 108.

As a rule, DI machine 100 responds to commands issued from drive 40, while EPRAN machine 102 responds to commands issued from host system 20. DI machine 100 includes a insertion/removal detection section 110 and a device master/slave initializer section 112. EPRAN machine 102 includes a reset, diagnostic command detection section 120; a host bus master/slave initialize section 122; and, a phantom or mirrored task file 124. As explained herein, phantom task file 124 is used to mirror device file 80 in device 40. Registers included in phantom task file 124 include the following: Alternate Status; Device Control; DataReg; Error; Status; Command; among other registers including those corresponding to registers in device task file 80.

DI machine 100 and EPRAN machine 102 are in communication with one another for transfer of information and signals therebetween. Bus 108 is shown in FIG. 2 for connecting device master/slave initializer section 112 of DI machine 100 with phantom disk file 124 of EPRAN 102.

MUXES 90 and 92 are controlled by reset, diagnostic command detection section 120, which issues MUX select signals on MUX select lines 125 and 126, respectively. Insertion/removal detection section 110 applies a signal on line 127 to reset, diagnostic command detection section 120 when section 110 detects that device 40 has been removed from Nest 30.

Nest 30 further includes a set of jumpers 130 which are connected to both DI machine 100 and EPRAN machine 102. Jumpers 130 include a jumper for selecting either master status, slave status, or cable selection status.

Components of Nest 30 can be fabricated on a chip if desired. In the illustrated embodiment, the components framed by broken line 131 (see FIG. 2) are included on an application specific integrated circuit (ASIC).

Figure 5A:
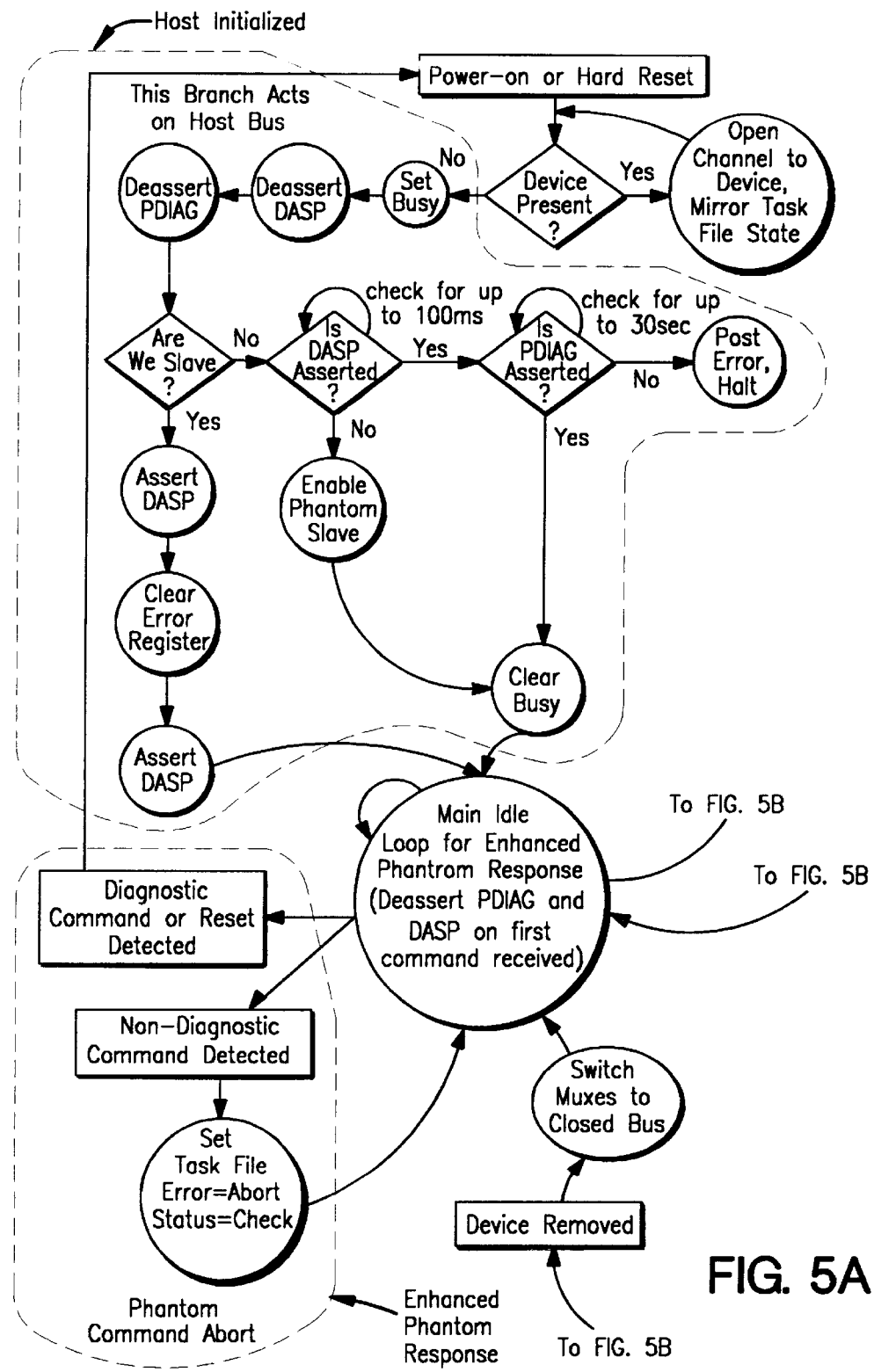
FIG. 5 is a state diagram showing states executed by an interfacing device (Nest) of an embodiment of the present invention.
Figure 5B:
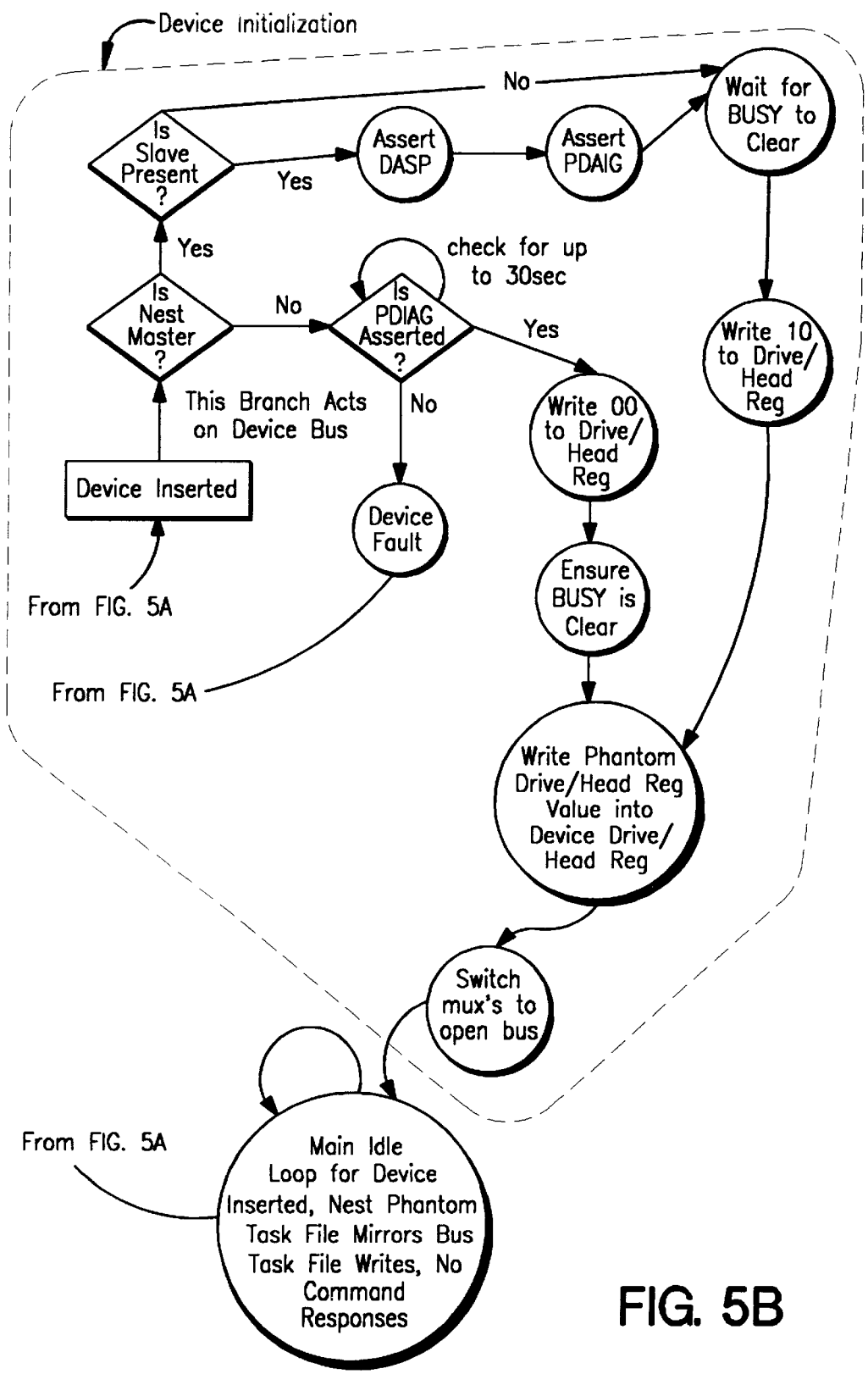

The functions of DI machine 100 and EPRAN machine 102 are described hereinafter. The structure of DI machine 100 and EPRAN machine 102 is not confined to any particular implementation, as the person skilled in art can deduce sufficiently from the functions and sections described herein suitable structure for performing the functions, particularly with reference to the state diagram of FIG. 5.

Nest 30 of the present invention facilitates numerous operations which were heretofore problematic in an IDE (ATA/ATAPI) system. For example, Nest 30 permits swapping or interchanging of devices in its internal bay 32 while ATA/ATAPI peripheral bus 60 is active. During the swap or interchange, Nest 30 permits isolation of its contained device from ATA/ATAPI peripheral bus 60 until the device is in a state compatible with ATA/ATAPI peripheral bus 60. Such swapping or interchange thus avoids having to power down computer system 20, and advantageously avoids crashes of computer system 20.

As indicated above, a master/slave relationship is established between peripherals on the same ATA/ATAPI bus at system reset. Conventionally, if no slave device is detected, then the master device responds to a host command for the slave with an error condition and no slave device is allowed to exist. Alternatively, if no master device is detected at reset, then neither master nor slave devices may exist and the bus is inactive. In the present invention, on the other hand, Nest 30 enables computer system 20 to initialize ATA/ATAPI peripheral bus 60 with an empty device bay 32 in either the master or the slave position. In this regard, Nest 30 sequences through the master/slave initialization during reset and diagnostic sequences.

Any device that is inserted into the device bay 32 must be properly initialized as master or slave, depending on the current configuration of the device bay 32 into which it is inserted. Nest 30 of the present invention properly initializes the inserted device to master or slave prior to placing the device on ATA/ATAPI peripheral bus 60.

Moreover, when the host computer system 20 sends a command to an empty device bay 32, Nest 30 responds in a manner consistent with the ATA or ATAPI protocols. When empty, Nest 30 responds to all commands (except the reset and diagnostic described above) with a command abort sequence (i.e., the result that a master device will return to a host in the absence of a slave, and is also the same response that an ATAPI device may return for an ATA command and vis-a-versa).

Nest 30 provides, over ATA/ATAPI peripheral bus 60, basic responses to host system 20 and other devices (e.g., device 70) on the same bus even if no device is installed in Nest 30. The basic responses of Nest 30 allow ATA/ATAPI peripheral bus 60 to initialize properly when no device is in bay 32 of Nest 30, and allow a device inserted in Nest 30 to initialize properly on insertion prior to access to ATA/ATAPI peripheral bus 60.

Nest 30 is capable of detecting the presence or absence of a device such as device 40. Such detection can be accomplished in many ways, such as sensing of an appropriate signal on a selected terminal upon connection of connector 42, for example. If device 40 is present at reset, then Nest 30 passes through on bus 94 all data and control signals to device 40 and device 40 functions normally as if it were connected directly to ATA/ATAPI peripheral bus 60. If there is no device detected in the Nest 30, then Nest 30 itself responds in a legal fashion through its own set of command and status registers (phantom task file 124). If there is no device in Nest 30, then Nest bus 94 is electrically isolated from ATA/ATAPI peripheral bus 60, thereby preventing spurious signals from the open connector from corrupting ATA/ATAPI peripheral bus 60. Nest 30 maintains the bus isolation until a device has been inserted into bay 32 and until the device has completed its own power-on/reset initialization.

Nest 30 is configured as master, slave, or cable select in the standard method prescribed in the ATA standard. Nest 30 passes the select signal through to the device connector 42 via the cable select line. All devices to be inserted into Nest 30 are preferably configured for cable select. In this manner the inserted device always inherits the master/slave setting of Nest 30 without having to be individually configured.

Nest 30 mimics or emulates the sequence of events that occur on a bus reset for a device that is inserted into Nest 30. This mimicry consists of performing the master/slave initialization to the inserted device upon its insertion and power-on, then loading the current value of the Device/Head register from Nest 30 phantom task file 124 into devices task file 80, thus establishing the current state of the bus in the device. For the operating system of this example, once the device 40 is mirroring the current state of the bus, then Nest 30 opens the bus to the device and Nest 30 ceases to respond to commands. Device 40 then functions as if it were connected directly to bus 60. Nest 60 continues to monitor bus 60, mirroring device task file 80 in its phantom task file 124 as device task file 80 is changed. When the device is removed from Nest 30, bus 94 to connector 50 is again isolated; phantom task file 124 in Nest 30 is placed on the bus; and Nest 30 takes over the responses for commands sent by the host computer system 20.

When there is no device present in its bay 32, in Nest 30 responds to the ATA hard reset, ATA soft reset, and "Perform Device Diagnostic" commands by initiating the master/slave protocol. All other commands are responded to immediately with a command abort error status or command completed good status. Any attempt to transfer data to or from the absent device, to position the absent device, or to set features in the absent device, are met with an abort error command. Optionally, commands such as power management commands (i.e. "Idle", "Sleep", or "Standby") may return good status indicating that the device is consuming minimum power (this may be desirable in order to comply with a host BIOS that performs power management on both ATA and ATAPI devices). This behavior is called an "enhanced phantom device response" herein.

Master/slave initialization takes place on power-up, when the ATA reset line is active (hard reset), when the SRST bit is set in the task file (ATA soft reset), or during the ATA command to Perform Device Diagnostics.

The following are the initialization responses based on various configurations.

I. Initialization sequence, device installed in Nest, Nest is master or slave:

1) Nest 30 allows device 40 full access to the ATA bus 60.
2) The inserted device 40 detects through the cable select line if it is master or slave.
3) The installed device 40 is responsible for all appropriate initialization action.
4) If Nest 30 is master, Nest 30 monitors the master slave initialization sequence in order to identify if the slave is present (this information is preserved in case the inserted device is extracted).

Nest 30 task file then assumes a mirroring mode to be ready with the current state in case of the device extraction. While mirroring device task file 80, Nest 30 does not respond to commands or alter the state of the bus.

II. ATA bus initialization sequence, no device in Nest, Nest is master, no slave present:

Nest 30 performs a standard ATA master device initialization and isolates the device bay connector from the host ATA bus 60.

1) Nest 30 asserts the BUSY bit, and deassert DASP and PDIAG signal lines.

2) Nest 30 attempts to detect DASP assertion by a slave unit according to ATA 2.

3) Nest 30 finds no slave present, clears all registers in the task file before clearing BUSY bit.

Nest 30 provides a phantom slave response as prescribed in the ATA specification by responding with a command abort sequence to any command sent to the absent slave device. Nest 30 provides the enhanced phantom device response for all attempted commands to the master device, until a device is inserted into Nest 30 and is initialized.

III. ATA bus initialization sequence, no device in Nest, Nest is master, slave present:

Nest 30 performs a standard ATA master device initialization and isolate the device bay connector from the host ATA bus 60.

1) Nest 30 asserts the BUSY bit, and deassert DASP and PDIAG signal lines.

2) Nest 30 attempts to detect DASP assertion by a slave unit according to ATA 2.

3) Upon detecting DASP and PDIAG, Nest 30 assumes a slave is present, and clears all registers in the task file before clearing BUSY bit.

Nest 30 does not respond to commands intended for the slave device. Nest 30 does provide the enhanced phantom device response for all attempted commands to the master device, until a device is inserted into Nest 30 and is initialized.

IV. ATA bus initialization sequence, no device in Nest, Nest is slave:

Nest 30 emulates a standard ATA slave device initialization and isolates the device bay connector from the host ATA bus. 60. As per ATA, a master device must be present. This emulation of the master/slave initialization prevents a master device from assuming the role of the phantom slave response, allowing a slave device to exist once it is inserted into Nest 30.

1) Nest 30 deasserts PDIAG signal line.

2) Nest 30 asserts DASP indicating slave present.

3) Nest 30 clears the task file error register, indicating no slave error.

4) Nest 30 asserts PDIAG completing master slave initialization.

5) Nest 30 deasserts DASP and PDIAG upon receiving the first command sent by the host.

Nest 30 provides the enhanced phantom device response for all attempted commands to the slave device until a device is inserted into Nest 30 and is initialized.

V. Device insertion initialization, Nest is master, no slave present:

While maintaining bus isolation, Nest 30 allows the device to initialize as master with phantom slave responsibility.

1) Nest 30 detects the insertion of the device.

2) The inserted device detects through the cable select line that it is master.

3) Nest 30 ensures that DASP and PDIAG lines are deasserted unless driven active by the inserted device.

4) The inserted device attempts to detect DASP, upon failing to detect the slave presence, the inserted device assumes the role of providing the phantom slave response.

5) The inserted device clears BUSY to indicate that interface initialization is complete.

6) Nest 30 writes the current contents of the Drive/Head register of phantom task file 124 into the Drive/Head register of the inserted device's task file 80 (additional task file registers may also be downloaded to the inserted device to achieve a more complete current state), thus ensuring that current device selection as established by the host remains uncorrupted.

7) Nest 30 switches the inserted device onto the active ATA bus 60.

Nest 30's task file 124 assumes a mirroring mode to be ready with the current state in case of the device extraction. While mirroring the device task file 80, Nest 30 does not respond to commands or alter the state of the bus.

VI. Device insertion initialization, Nest is master, slave is present:

While maintaining bus isolation, Nest 30 allows the device to initialize as master with slave present.

1) Nest 30 detects the insertion of the device.

2) The inserted device detects through the cable select line that it is master.

3) Nest 30 deasserts PDIAG signal line to the inserted device.

4) Nest 30 asserts DASP to the inserted device indicating slave present.

5) Nest 30 clears the task file error register to the asserted device, indicating no slave error.

6) Nest 30 asserts PDIAG to the inserted device completing master slave initialization.

7) The inserted device detects DASP and PDIAG recognizing slave present, the inserted device does not respond to commands issued to the slave device.

8) The inserted device clears BUSY to indicate that interface initialization is complete.

9) Nest 30 writes the current contents of the Drive/Head register of task file 124 into the Drive/Head register of the inserted device's task file 80 (additional task file registers may also be downloaded to the inserted device to achieve a more complete current state), thus ensuring that current device selection as established by the host remains uncorrupted.

10) Nest 30 switches the inserted device onto the active ATA bus 60.

Nest 30 task file assumes a mirroring mode to be ready with the current state in case of the device extraction. While mirroring the device task file 80, Nest 30 does not respond to commands or alter the state of the bus.

VII. Device insertion initialization, Nest is slave. As per ATA, a master device must be present:

While maintaining bus isolation, Nest 30 allows the device to initialize as slave.

1) Nest 30 detects the insertion of the device.

2) The inserted device detects through the cable select line that it is slave.

3) Nest 30 detects DASP then PDIAG as inserted device initializes as slave.

4) Nest 30 writes the current contents of the Drive/Head register of task file 124 into the Drive/Head register of the inserted device's task file 80 (additional task file registers may also be downloaded to the inserted device to achieve a more complete current state), thus ensuring that current device selection as established by the host remains uncorrupted.

5 Nest 30 switches the inserted device onto the active ATA bus 60.

Nest 30's task file 124 assumes a mirroring mode to be ready with the current state in case of the device extraction. While mirroring the device task file 80, Nest 30 does not respond to commands or alter the state of the bus.

In the case of an error in the inserted device initialization, Nest 30 assumes a hardware fault and maintains bus isolation and continues to provide the enhanced phantom device response to the ATA bus 60. A proprietary command or command sequence can be implemented to force Nest 30 to place the faulty device on ATA bus 60 for diagnostic purposes.

The configurations described in Table 1 allow for maximum compatibility:

TABLE 1

Recommended Master/Slave Configurations
for Maximum System Compatibility
with Mixed Device Protocols Sharing an ATA Bus

| Master | Slave |
|---|---|
| ATA Device | ATA Device |
| ATA Device | ATAPI Device |
| ATAPI Device | ATAPI Device |
| ATA Device | Nest |
| ATAPI Device | Nest |
| Nest | Nest |

Placing newer protocol devices in slave positions allows legacy device drivers and system BIOS to see the newer devices as phantom slaves. Any Nest aware device driver must also be aware of the potential for either ATA or ATAPI protocol devices to sharing the same bus. A Nest aware device driver is one that is tolerant of the fact that a user may remove, insert, or swap a device. And the device swap may exchange ATA and ATAPI protocols (i.e. an ATAPI tape drive is removed and an ATA hard drive is inserted).

In some embodiments a signature value is inserted in the task file Byte Count High and Byte Count Low registers, similar in concept to the ATAPI signature placed in these registers at various times. The Nest signature is always read from the byte count registers when no device is present. This provides a mechanism for Nest aware device drivers to recognize a Nest without a device inserted, and also ensure that ATAPI drivers do not assume the empty Nest to be an ATAPI device.

Usage of the Interfacing Device (Nest) 30 has been described above in connection with an IBM AT-compatible host having a DOS or Windows 3.x computer systems, such as the computer system 20 shown in FIG. 4. The Nest 30 of the present invention can also be used with computers having other types of operating systems, such operating systems marketed by Microsoft Corporation as Windows95™ or Windows NT™, or operating systems which accommodate "plug and play" capabilities, such as that typified by computer system 200 shown in FIG. 6.

The host of computer system 200 of FIG. 6 has a motherboard 202 which resembles motherboard 61 of computer system 20 shown in FIG. 4. In this regard, like motherboard 61, motherboard 202 has main processor 62, primary ATA host adapter 63A, secondary ATA host adapter 63B, PCI bus 64A, ISA Bus 64B, main processor bus 66, and Random access memory (RAM) 67. In addition, motherboard 202 has two additional IDE (ATA) host adapters 63C and 63D connected to ISA bus 64B. Adapters 63C and 63D are preferably interface cards, whereas adapters 63A and 63B may be either chips or interface cards.

Random access memory (RAM) 67 of computer system 200 of FIG. 6 includes an image 76 of device task file 80. The image 76 of the device task includes eleven mirror registers 78A–78K, such eleven registers having the following names: DataReg (register 78B); ErrorReg (register 78C); IntReasonReg (register 78D); SamTagReg (register 78E); ByteCntReg (register 78F); DrvSelReg (register 78G); DevCntrReg (register 78H); StatusReg (register 78I); AltStatusReg (register 78J); and, CommandReg (register 78K).

Figure 7:
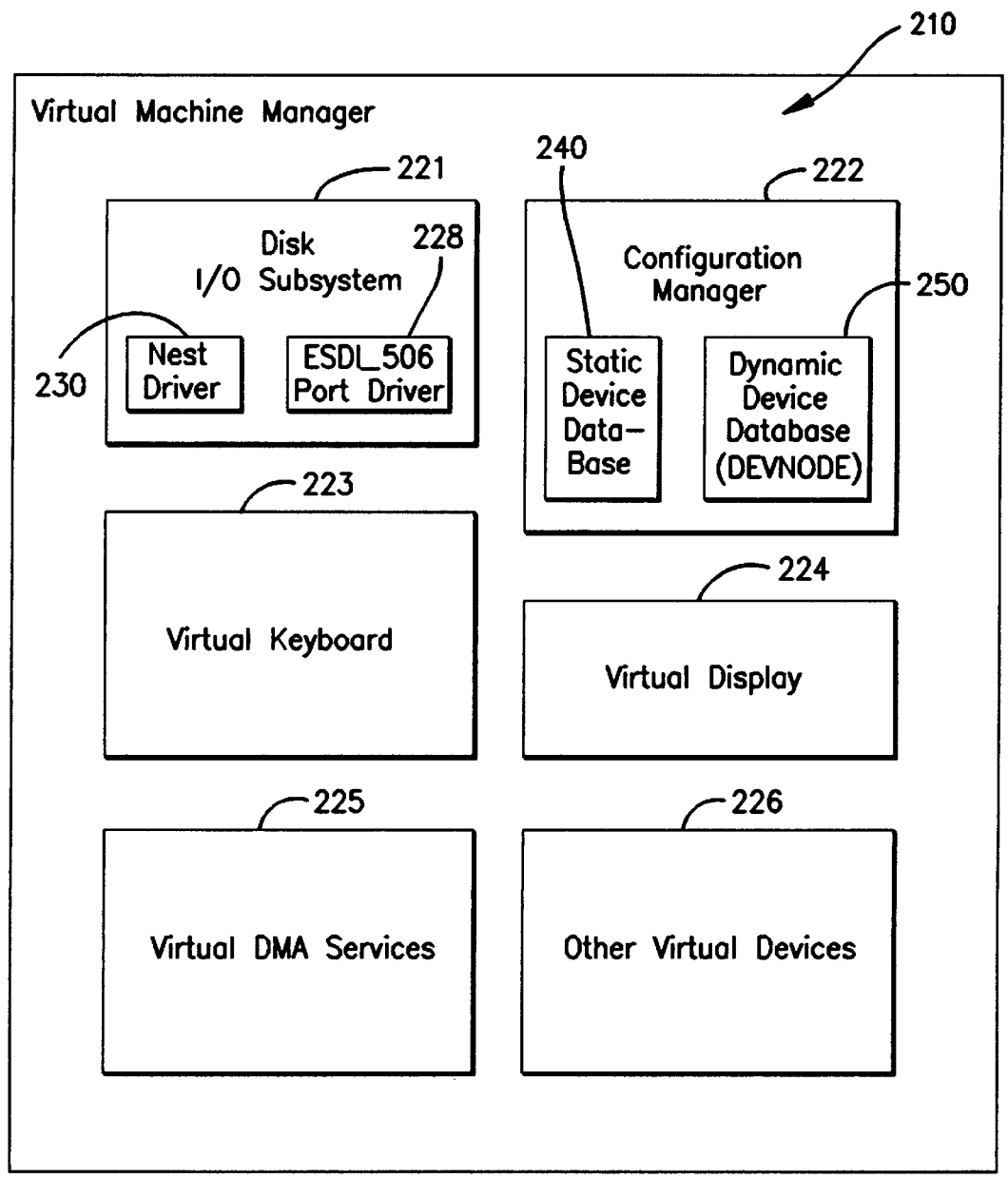
FIG. 7 is a schematic view of a virtual machine manager of a computer system having a second type of operating system.

FIG. 7 illustrates a virtual machine manager 210 of the Microsoft Windows 95™, particularly depicting software objects executed by microprocessor 62. As shown in FIG. 7, virtual machine manager 210 includes six subsystems: disk I/O subsystem 221; configuration manager 222; virtual keyboard subsystem 223; virtual display subsystem 224; virtual DMA services subsystem 225; and, subsystem 226 for other virtual devices.

The manufacturer of the operating system provides disk I/O subsystem 221 with a driver known as "ESDI_506", represented as port driver 228 in FIG. 7. One aspect of the present invention is the provision of a further driver, known as the Nest driver, shown as driver 230 in FIG. 7.

Configuration manager 222 manages two databases: static device database 240 and dynamic device database (Devnode) 250. Static device database 240 includes a listing of all types of devices which have been connected to computer system 200 at any point in the history of computer system 200. Dynamic device database (Devnode) 250, on the other hand, includes a listing of only those devices which are currently connected to computer system 200. It will be appreciated that static device database 240 can have entries for devices which have not remained connected to computer system 200, and that dynamic device database (Devnode) 250 must be updated or reenumerated whenever there is a change of connection of a device to computer system 200.

Figure 8:
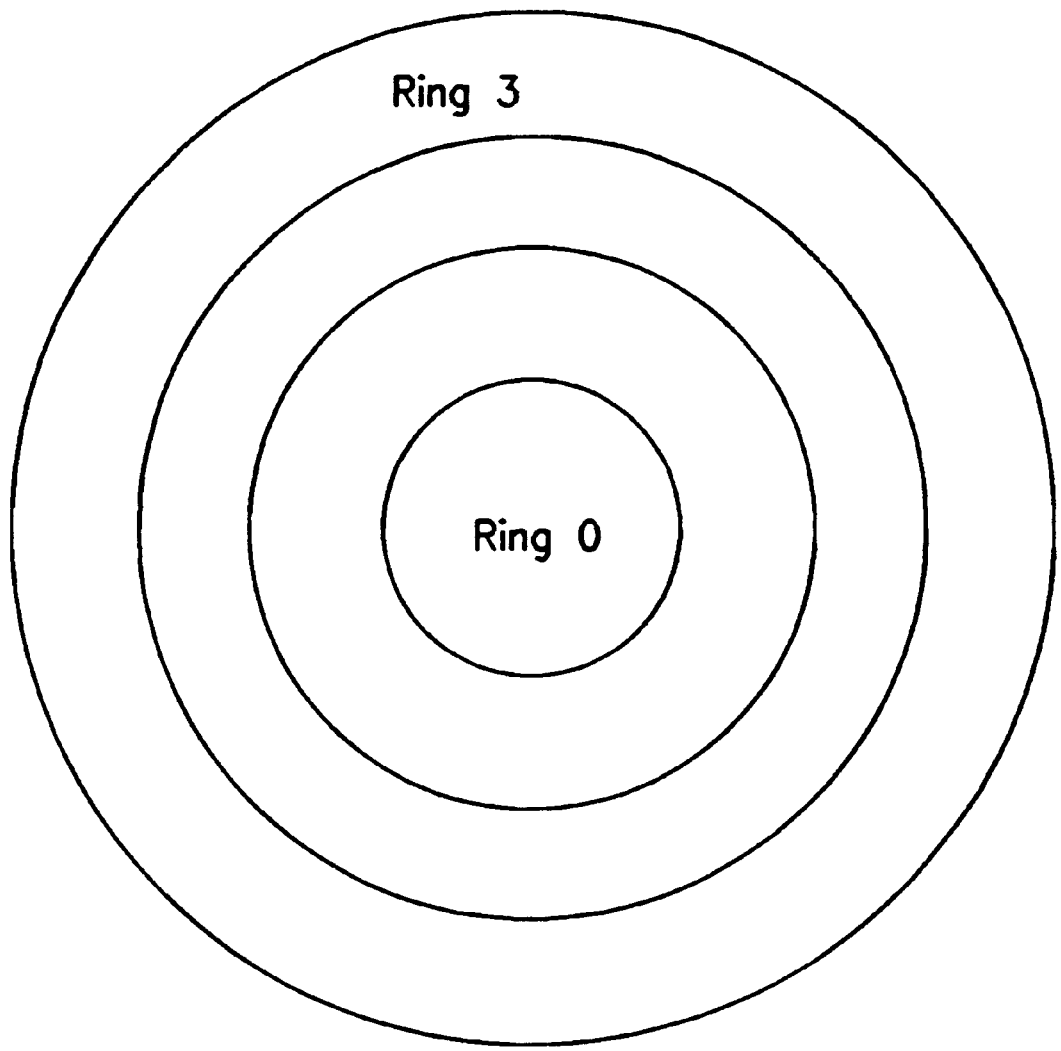
FIG. 8 is a schematic diagram showing a concept of rings in the computer system of FIG. 6.

The operating system of computer system 200 of FIG. 6 is a time-tasking operating system which subsumes the notions of "rings". As shown in FIG. 8, the operating system has ring 0 and ring 3. The tasks, jobs, or functions executed by the operating system of computer 200 are each assigned to one of its rings. Each ring is associated with a certain range of memory addresses to which it is permitted access. Moreover, in view of the time tasking of the operating system, tasks which are in ring 0 can be executed in "ring 0 time", while tasks which are in ring 3 can be executed in "ring 3 time". Typically ring 0 is deemed to have a greater preferential value than ring 3, since e.g., ring 0 may be entitled access to all memory locations while ring 3 may be permitted access to only a limited number of memory locations. It is sometimes said that ring 3 objects are executed at "Appy Time". If a ring 3 task attempts to perform an activity to which it is not entitled (e.g, access an unpermitted memory location), an GPF fault occurs.

Utilization of Nest 30 in computer system 200 presents problems not encountered in computer system 20, primarily in view of the different type of operating system resident in computer system 200. In this regard, the operating system of computer system 200 requires a more sophisticated collection of command responses to allow proper operating system configuration and "hot swapping". By "hot swapping" is meant the ability to change devices in Nest 30 while the IDE bus 60 to which Nest 30 is connected remains active.

Concerning operating system configuration, upon boot-up configuration manager 222 of computer system 200 makes an inventory of IDE devices connected to its IDE host adapters 63 (see FIG. 6), e.g., listing the connected IDE devices in dynamic device database (Devnode) 250, and thereafter makes the assumption that during operation following the boot-up that connections of IDE devices will not change. Therefore, for any given boot-up, configuration manager 222 makes a permanent registration of then-connected IDE devices in dynamic device database (Devnode) 250. While the registration of IDE devices in dynamic device database (Devnode) 250 may change from one boot-up to another boot-up, for a given boot-up of computer system 200 the configuration manager 222 makes but one registration of IDE devices, i.e., a permanent registration. This permanent registration procedure of computer system 200 is inappropriate for the interface device or Nest 30 of the present invention, which has as one of its functions the facilitating of hot-swapping or interchanging of differing IDE devices 40 in its bay 32 while the IDE bus is still active in a single boot-up session.

Nest driver 230 of the present invention accommodates Nest 30 in a type of operating system described above with reference to computer system 200, i.e., an operating system which presumes permanent installation of IDE devices during a boot-up session. Nest driver 230 is shown in FIG. 7 as being included in disk I/O subsystem 221. Nest driver 230 is a file of executable instructions which can automatically be included in disk I/O subsystem object 221 by providing nest driver 230 with a proper file extension. In a Microsoft Windows 95™-type operating system, the proper file extension is ".VxD". In the illustrated embodiment, upon booting up the nest driver 230 is loaded into a vendor specific driver (VSD) layer of disk I/O subsystem 221, such as one of layers 8–10, 12–17 of the IOS hierarchy levels.

Figure 9:
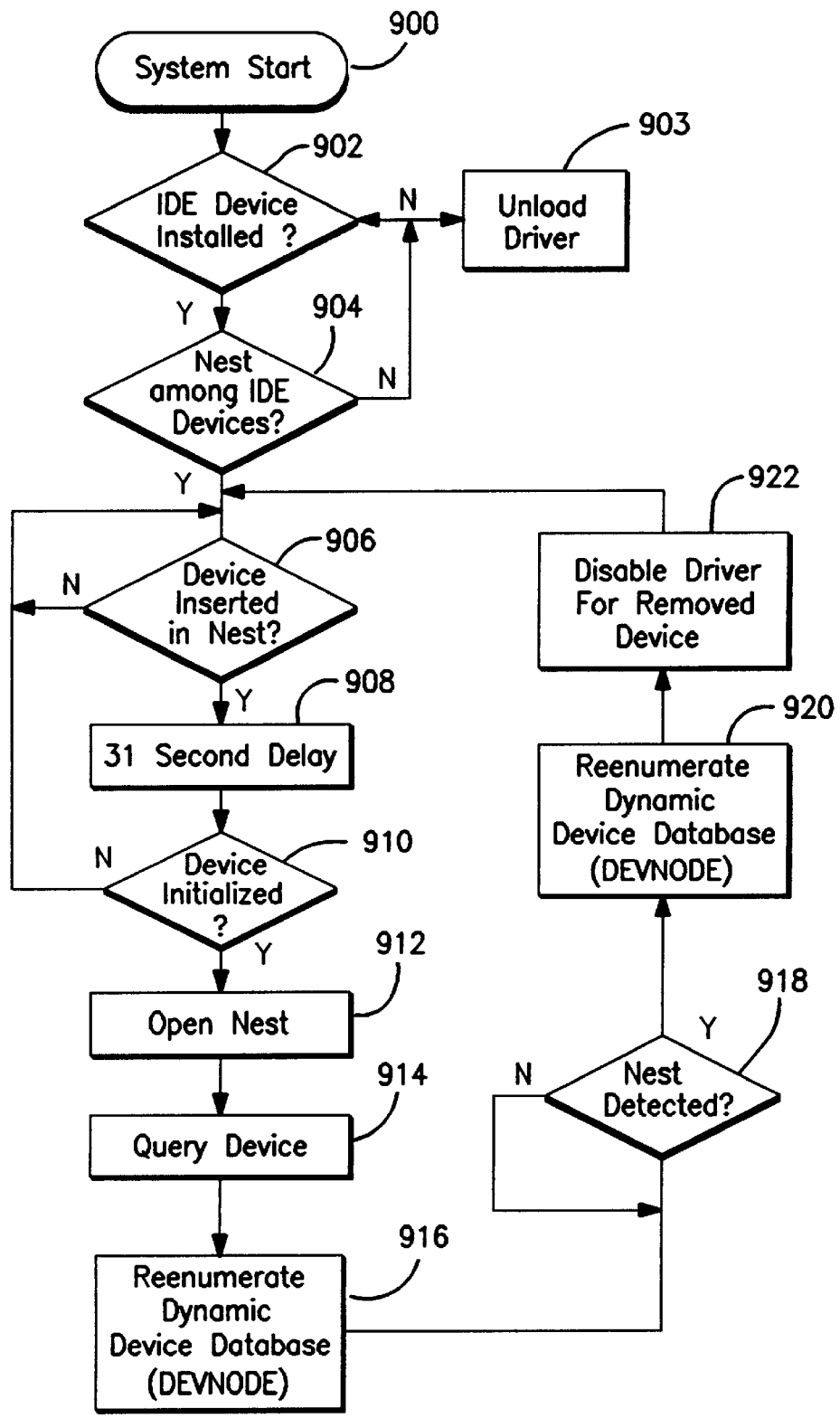
FIG. 9 is a flowchart showing basic steps executed by a nest driver in the computer system of FIG. 6.

FIG. 9 is a flowchart showing basic steps executed by nest driver 230 in the computer system 200 of FIG. 6. Inclusion of nest driver 230 in the object of disk I/O subsystem 221 in the manner above described is shown in FIG. 9 as being part of a system start step 900.

After system start, at step 902 nest driver 230 checks for connection of an IDE device by issuing a suitable command to each of the IDE host adapters 63A–63D. Issuance of a command occurs by nest driver 230 causes a particular one of a set of command values to be loaded into CommandReg register 78K of image file 76 of FIG. 6. Microprocessor 62 then outports the instruction in CommandReg register 78K to buses 60A–60D. In response to issuance of the command at step 902, nest driver 230 examines returned values on each of IDE buses 60A–60D to determine whether a "signature" indicative of an IDE device has been returned. If nest driver 230 sees a string of hexadecimal "F" values on any of IDE buses 63, nest driver 230 realizes that no device is connected to such bus 63. If nest driver 230 sees a value corresponding to an "Abort" command on any of IDE buses 63, nest driver 230 realizes that the device connected to that bus is not an IDE/ATAPI device. If, on the other hand, nest driver 230 sees a hexadecimal value "EB14" being returned via any bus 63 through the ByteCntReg register 78F in image 76, nest driver 230 knows that an IDE/ATAPI device is connected to that bus 63. FIG. 9 shows that if an IDE/ATAPI device is detected at step 902, execution continues with step 904. Otherwise, nest driver 230 is unloaded at step 903.

When queried at step 902, Nest 30 returns the hexadecimal value "EB14" indicative of an IDE device, but so do other IDE/ATAPI devices. Therefore, at step 904 nest driver 230 endeavors to determine which, if any, of the located IDE/ATAPI devices are Nests 30 of the present invention.

Nest driver 230 discriminates for the presence of Nest 30 by issuing a standard IDE "Identify Device" command to the IDE host adapters 63 which responded as having IDE/ATAPI devices connected thereto. The first information which nest driver 230 receives back from each such IDE host adapter 63 is status information which is loaded into the StatusReg register 78I (see FIG. 6). By examining the content of the StatusReg register 78I, nest driver 230 knows when it can go and pick up further data being automatically transmitted by the IDE device on bus 60 following the status information and in response to the IDE "Identify Device" command. That further data consists of 256 words of identification information which is buffered one byte at a time through the DataReg register 78B in route to other memory locations. By examining one or more particular words of the 256 words of identification information, nest driver 230 can ascertain in a device signature field an ASCI string which serves as a signature for the connected IDE device. Nest 230 responsively transmits a predetermined and unique nest signature. If, at step 904, the nest signature is received, nest driver 230 has established that the IDE device connected to that IDE bus 60 is Nest 30. If it is thus established that the IDE device is Nest 30, execution continues with step 906. Otherwise, nest driver 230 is unloaded as indicated by step 903.

It should be understood that more than one of the IDE buses shown in FIG. 6 may simultaneously have Nests 30 connected thereto. In the illustrated embodiment, IDE buses 60C and 60D are particularly susceptible to accommodating Nests 30, but for sake of simplification only bus 60C has a nest (Nest 30C) connected thereto. For sake of simplicity, the sole illustrative connected Nest is referred to as Nest 30.

In so far as any non-Nest IDE devices 40 are connected, such devices located at step 902 are handled by the operating system of computer system 200 in accordance with the predefined procedure of the operating system. In this regard, configuration manager 222 makes a permanent registration of those non-Nest IDE devices 40 in the dynamic device database (Devnode) 250.

When a device 40 is inserted into Nest 30 and locking key 57 is operated to lock device 40 into Nest 30, an electrical connection is made with circuit board 34. The making of the electrical connection is sensed by detector 110. Detector 110 sends a signal on line 127 to reset, diagnostic command detect section 120, which in turn sets an appropriate bit in word 128 of the responsive information which is to pass through the DataReg register in phantom task file 124.

Detection of an inserted device in bay 32 of Nest 30 involves insertion/removal detection 110 (see FIG. 2). When locking key 57 is turned after insertion of device 40, an electrical connection is made with circuit board 34. The making of the electrical connection is sensed by detector 110, which causes word 128 to appropriately indicate the sensed detection.

At step 906 the nest driver 230 determines whether a device has been inserted into bay 32 of Nest 30. This determination is also made by referring to the predetermined fields of the 256 words of identification information returned on bus 60 in response to the IDE "Identify Device" command. In particular, word 128 of the returned identification information indicates whether Nest 30 has sensed reception of a device 40 into its internal bay 32.

It was mentioned above that a standard IDE "Identify Device" command was issued at step 904. Actually, unless overridden by a special post-initialization flag mentioned below, nest driver 230 causes issuance of the IDE "Identify Device" command once every second. However, after nest driver 230 has ascertained at step 906 that device 40 has been inserted into Nest 30, nest driver 230 imposes a 31 second delay (step 908). During this 31 seconds, nest driver 230 suppresses the issuance of the IDE "Identify Device" commands which otherwise would occur once per second.

After the 31 second delay, at step 910 Nest 30 determines whether the inserted device 40 has been initialized, and whether the device 40 has been properly initialized. The initialization determination operation conducted by Nest 30 differs in accordance with whether the device has inherited a slave or master status from Nest 30.

In determining initialization status of a slave device, device master slave initializer 112 determines whether a PDIAG signal line on the bus between device 40 and MUX 90 is asserted. If the PDIAG signal line is asserted, Nest 30 knows that device 40 has been initialized. If the PDIAG signal line is not asserted within 31 seconds, Nest 30 deduces that device 40 has been initialized, but that the initialization of device 40 was an incorrect initialization.

In determining initialization status of a master device, device master slave initializer 112 reads repeatedly the StatusReg register of device task file 80 of device 40. When the StatusReg register of device task file 80 in not busy, initializer 112 knows that device 40 is initialized. Once the StatusReg register of device task file 80 is not busy, initializer 112 reads the Error register of device task file 80. If initializer 112 determines that the Error register of device task file 80 has a predetermined value (e.g., hexadecimal "01" for some devices), initializer 112 realizes that device 40 has passed its diagnostic (i.e., that the initialization of device 40 was a correct initialization).

In both cases of device 40 being a slave device and master device, initializer 112 communicates the fact of initialization to phantom task file 124. In particular, initializer 112 provides an indication of device initialization, so that an appropriate bit can be set in word 128 which passes through the DataReg register of phantom task file 124 in response to a forthcoming IDE "Identify Device" command.

Step 910 shows nest driver 230 attempting to determine whether Nest 30 has determined that the device inserted into its has been initialized. This determination is attempted by an instance of issuance of the IDE "Identify Device" command. The 256 word identification information received in response from Nest 30 includes a field (word 128) which reflects whether the inserted device has been initialized. Thus, step 910 indicates that nest driver 230 repetitively issues the IDE "Identify Device" command until confirmation is received in word 128 that the inserted device 40 in Nest 30 has been initialized. Nest 30 detects whether the device 40 inserted therein has been initialized by examination of word 128, bits 0–2.

After initialization has been confirmed at step 910, at step 912 nest driver 230 issues an OpenNest command by placing the hexadecimal value "F0" in the CommandReg register 78J of image 76 and then outporting the command to bus 60. The hexadecimal value "F0" is thus transmitted on IDE bus 60 to Nest 30, and placed in the corresponding CommandReg register of phantom task file 124 (see FIG. 2). The reset, diagnostic command detect section 120 reads the CommandReg register, and upon receipt of the OpenNest command sends signals on MUX select lines 125 and 126 to open MUX 92 and MUX 90 so that signals on IDE bus 60 are transmitted via internal pass through bus 94 to device task file 80 of the device 40. Step 912 is thus referred to as the "open nest" step. Prior to step 912, section 120 keeps device 40 isolated from IDE bus 60 by controlling MUX 92 so that the IDE bus is connected to phantom task file 124, and by controlling MUX 90 so that initializer 112 is connected to device task file 80 of device 40.

It should be understood that the opening of Nest 30 results in operations such as those previously described, including for example the writing of the current contents of the Nest's phantom task file 124 into the device task file 80. These previously described operations are not the responsibility of nest driver 230, but of Nest 30 itself.

At step 914 the device 40 in Nest 30 is queried to determine its device type. The device query of step 914 is the next issuance of the IDE "Identify Device" command which, as mentioned above, nominally occurs every second. In response to the IDE "Identify Device" command, the status information is loaded into the StatusReg register 78I and followed by the buffering of the responsive 256 word identification information through the DataReg register as above described. As previously indicated, the 256 word identification information response includes an ASCII string which identifies the device type. It may turn out that the installed device is any of a plurality of IDE devices, such as a TR4 Eagle™ magnetic tape drive manufactured by Exabyte Corporation, a LS120 magnetic tape drive manufacture by Panasonic, a hard disk drive, or a "Zip" magnetic tape drive manufactured by Iomega Corporation.

After the device type of the device 40 in Nest 30 has been discovered, that device type must be included in the dynamic device database (Devnode) 250 maintained by configuration manager 222. As mentioned above, the operating system of computer system 200 establishes the contents of dynamic device database (Devnode) 250 only once per boot-up session. Since on its own the operating system of the computer system 200 might not be able to configure dynamic device database (Devnode) 250 as including Nest 30, the operating system is unable to reflect any subsequent insertion of a device into Nest 30 or hot swapping of devices in Nest 30. As described above, nest driver 230 of the present invention overcomes this constraint of the operating system.

In the above regard, at step 916 nest driver 230 reenumerates dynamic device database (Devnode) 250. Reenumeration of dynamic device database (Devnode) 250 is understood with reference to the substeps shown in FIG. 10, and is further illustrated by FIG. 11. At substep 916-1, nest driver 230, residing in ring 0 and being executed in ring 0 (see FIG. 8), schedules a portion of its code, known as "Devnode Handler", to be executed in ring 3. Subsequently, in accordance with the scheduling of substep 916-1, during the time slice of execution allotted to ring 3, "Devnode Handler" begins execution (step 916-2). Execution of "Devnode Handler" serves to add or take away a device from a tree structure of dynamic device database (Devnode) 250.

Figure 11:
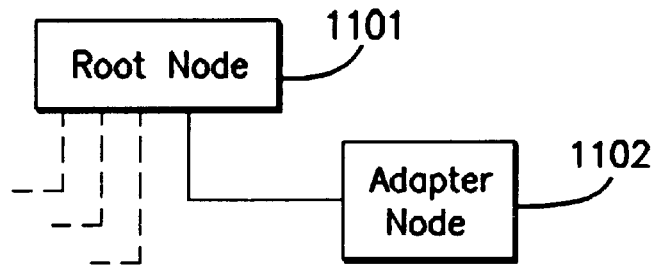
FIG. 11, FIG. 11A, and FIG. 11B are schematic diagrams showing a tree structure of a dynamic device database of the present invention.

The tree aspect of dynamic device database (Devnode) 250 is shown in FIG. 11. FIG. 11 reflects a point in time prior to execution of step 916, with the tree structure of dynamic device database (Devnode) 250 including nodes 1101 and 1102. Node 1101 is a root node of the database's tree structure. Node 1102 (connected by a branch to root node 1101) corresponds to the particular IDE host adapter 63C (see FIG. 6) to which Nest 30C is connected. The tree of FIG. 11 also has other branches, shown as broken lines, which are understood to be connected to objects corresponding e.g., to other adapters (e.g., adapters 63A, 63B, and 63C) and which are not involved in the ensuing discussion. The nodes shown in FIG. 11 and related figures correspond to software objects and not to hardware components.

It is expected that after execution of step 916 of FIG. 9 that another node will be added to FIG. 11, specifically a node corresponding to device 40C which has been inserted in Nest 30C. When such occurs, node 1102 will be referred to as the "parent node" of the newly inserted device.

Figure 11A:
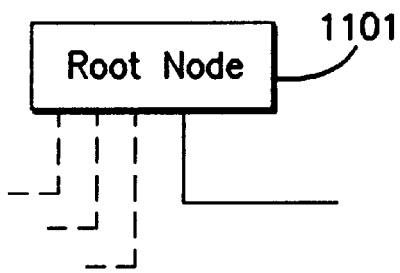

Included in "Devnode Handler" is a function call "CONFIGMG_Remove_SubTree" which is executed at substep 916-3. This function call is passed a parameter which specifies that the "parent node" of the newly inserted device is to be removed from the tree. Thus, in the context of the illustrated example, execution of function call "CONFIGMG_Remove_SubTree" at substep 916-3 results in removal of node 1102 (the parent to device 40C) from the tree, as illustrated by the crossing out of node 1102 in FIG. 11A. Specifying a node for removal from the tree of dynamic device database (Devnode) 250 by calling of function "CONFIGMG_Remove_SubTree" also entails removal of all children nodes of the removed node.

In view of the configuration of the operating system of computer system 200, it is imperative that the function call "CONFIGMG_Remove_SubTree", which is part of "Devnode Handler", be executed in ring 3. For convenience the illustrated implementation shows the entire routine "Devnode Handler" being executed in ring 3, but such need not be the case. In an alternate implementation, "Devnode Handler" can have all of its instructions except function call "CONFIGMG_Remove_SubTree" executed in ring 0.

Figure 11B:
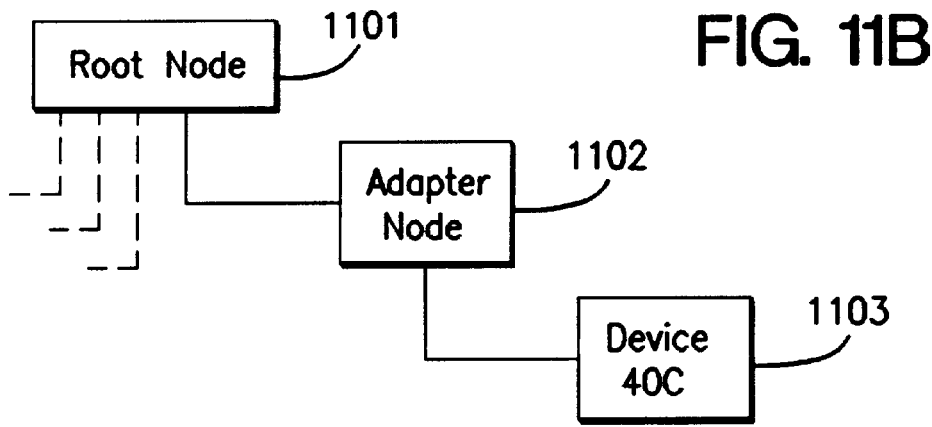

After node removal at substep 916-3, at substep 916-4 nest driver 230 calls a standard driver of the operating system, particularly port driver 228 (ESDI_506) [see FIG. 7]. One of the functions of port driver 228 (ESDI_506) is to perform an IDE hardware inventory of computer system 200 and to update dynamic device database (Devnode) 250. After conducting the inventory of substep 916-4, the tree of dynamic device database (Devnode) 250 appears as in FIG. 11B. FIG. 11B shows the tree as including root node 1101, the (re-added) parent node 1102, and node 1103 corresponding to device 40C newly inserted in Nest 30C.

Figure 10:
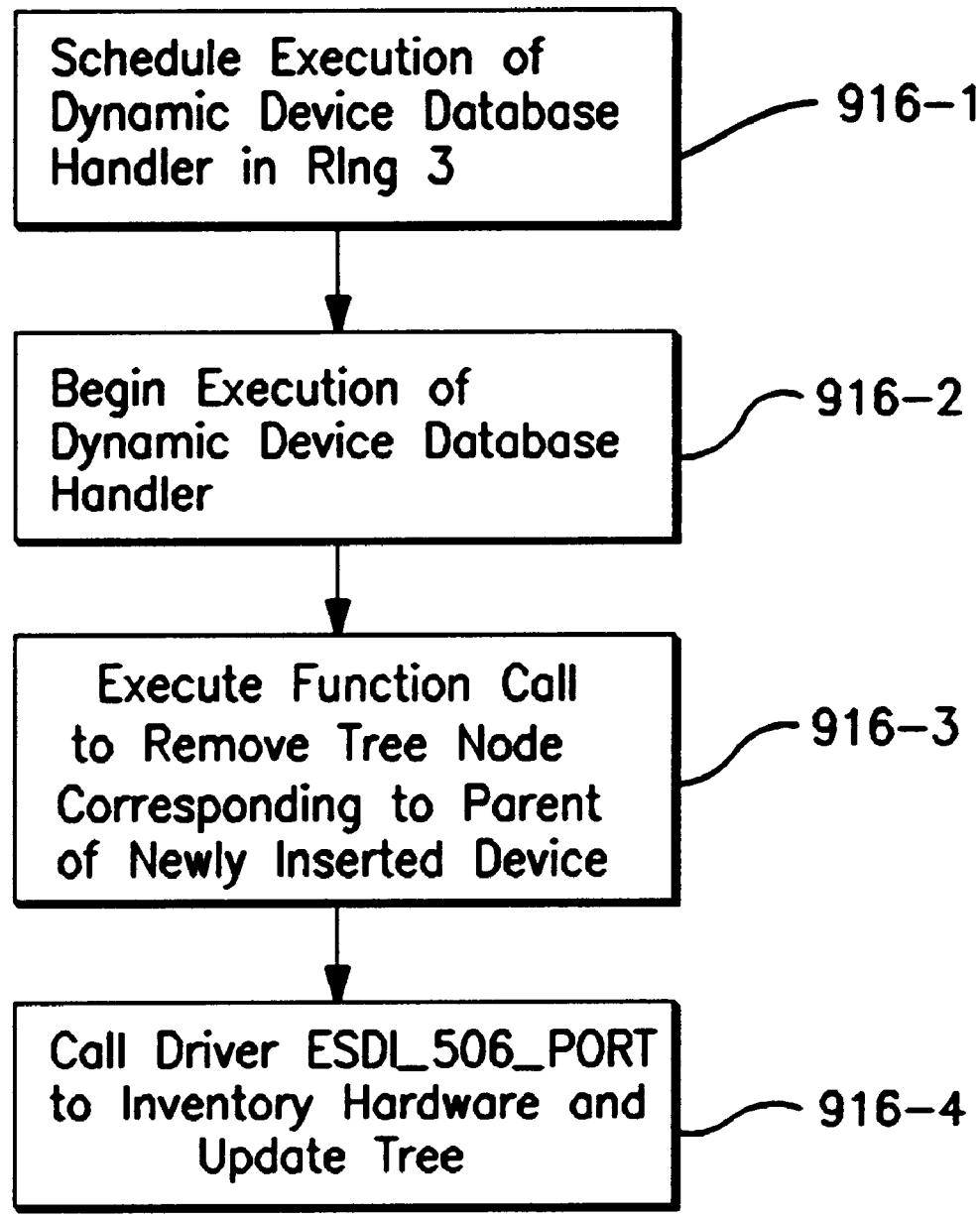
FIG. 10 is a flowchart showing substeps executed in connection with a reenumeration step of FIG. 9

Another function of port driver 228 (ESDI_506), reflected by step 916-4 of FIG. 10, is to enable a particular device driver provided in the operating system for the type of device 40C found to reside in Nest 30C. When called at substep 916-4, port driver 228 (ESDI_506) opens an appropriate one of the operating system device drivers for device 40C depending on the type of the device 40C. A library of such device drivers is provided in the operating system, such device drivers being standardized and an appropriate one selected by port driver 228 (ESDI_506).

Returning now to the steps of FIG. 9, after reenumeration step 916 the nest driver 230 checks (at step 918) whether a Nest is detected. The check of step 918 involves the periodic issuance of the IDE "Identify Device" command discussed above. If a device remains inserted in the Nest 30 (such as device 40C in Nest 30C in FIG. 6), nest driver 230 should not detect a nest but instead the device. That is, as long as a device is inserted in Nest 30, Nest 30 is transparent to the operating system and the device is seen instead. Thus, if a device is installed in Nest 30, at step 918 the response to the IDE "Identify Device" command should be an IDE-device-indicative value other than the signature of the Nest 30.

If it turns out that a Nest 30 is detected at step 918, nest driver 230 realizes that the device has been removed from Nest 30. In view of removal of the device from Nest 30, at step 920 the dynamic device database (Devnode) 250 must again be reenumerated to reflect deletion of the removed device. Details of reenumeration step 920 are understood with reference to previously-described step 916 and its substeps (see FIG. 10). As part of the reenumeration of step 922, port driver 228 (ESDI_506) disables the device driver of the removed device, as depicted by step 922 of FIG. 9.

As mentioned above, nest driver 230 nominally issues a IDE "Identify Device" command once every second. This periodic command issuance is reflected by step 906. Should another device be inserted in Nest 30, a response to a subsequent IDE "Identify Device" command will indicate that another device has been inserted. Subsequent steps of FIG. 9 are then executed in connection with the newly inserted other device, so that this other device is initialized, opened, queried, and the dynamic device database 250 is reenumerated to reflect inclusion of this newly inserted other device.

It should be understood that a sequence of devices, including differing devices, may be interchanged or "hot swapped" into Nest 30 during a single boot-up session, and that steps 906–922 of nest driver 230 can be executed for each such device without having a power down of computer system 200.

Figure 12A:
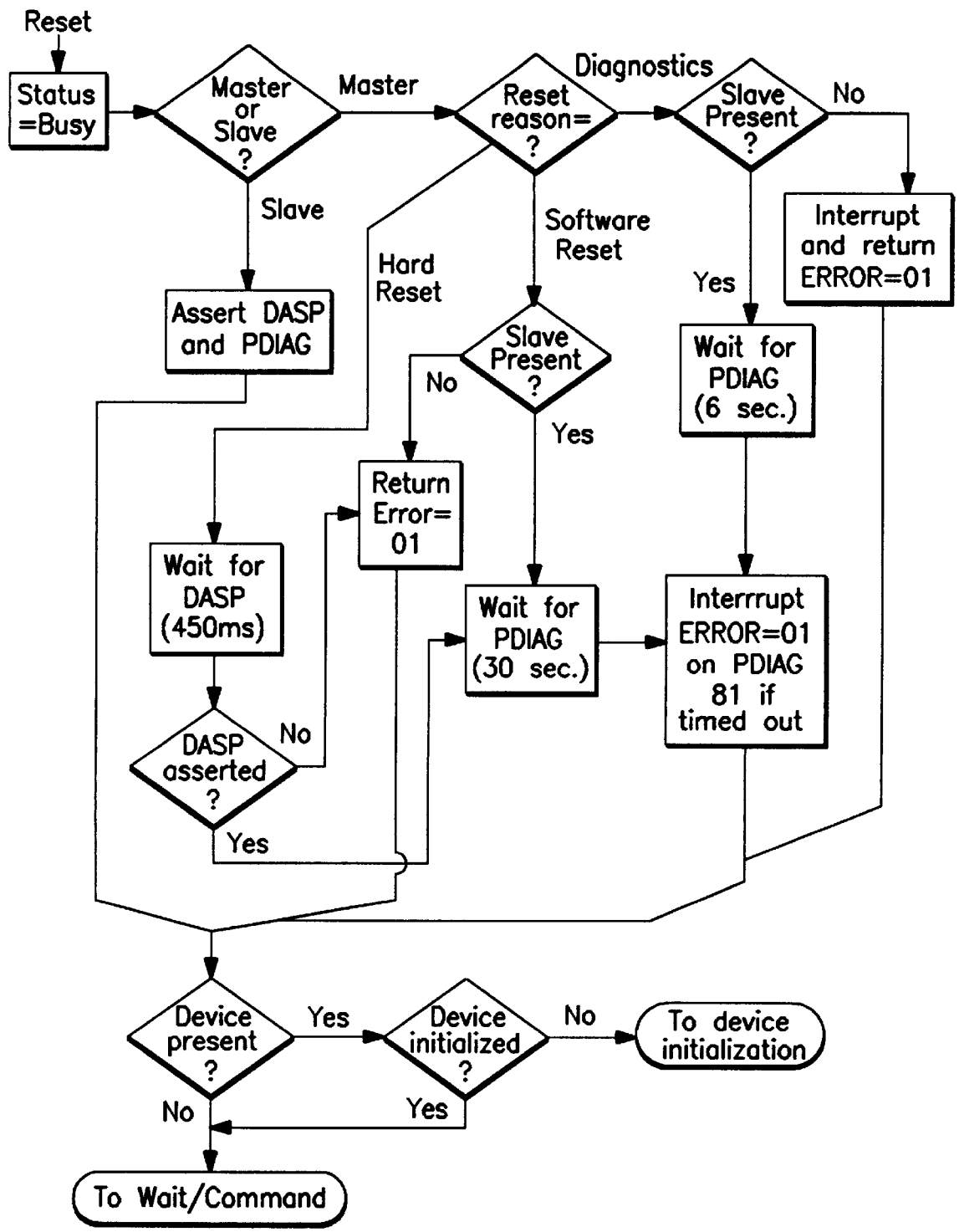
FIG. 12A, FIG. 12B, and FIG. 12C are state diagrams showing states executed by an interfacing device (Nest) of an embodiment of the present invention in conjunction with the computer system of FIG. 6.
Figure 12B:
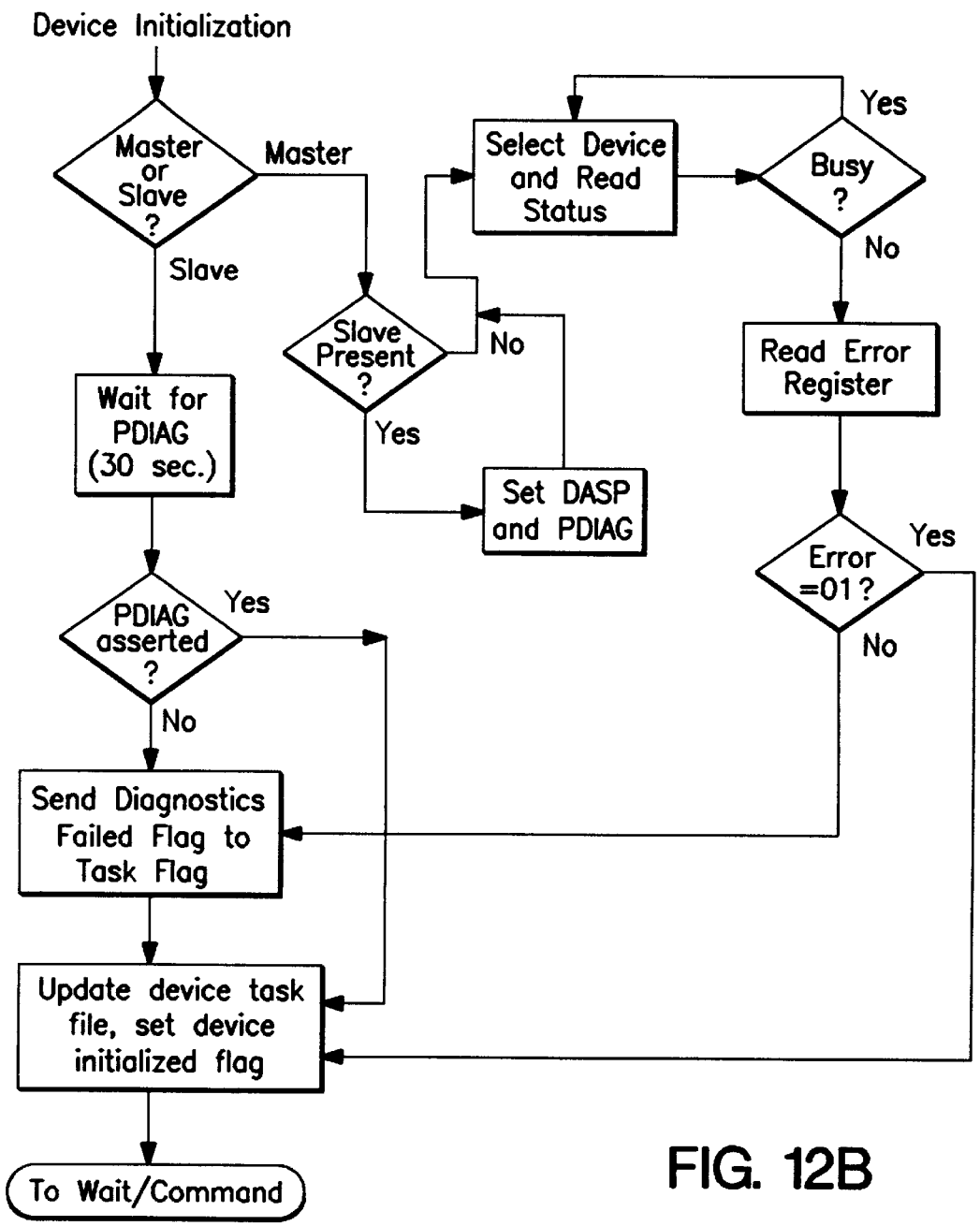
Figure 12:
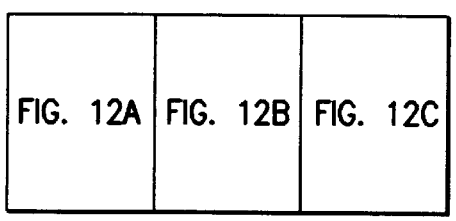
FIG. 12 is a schematic diagram illustrating the relationships between FIG. 12A, FIG. 12B, and FIG. 12C.
Figure 12C:
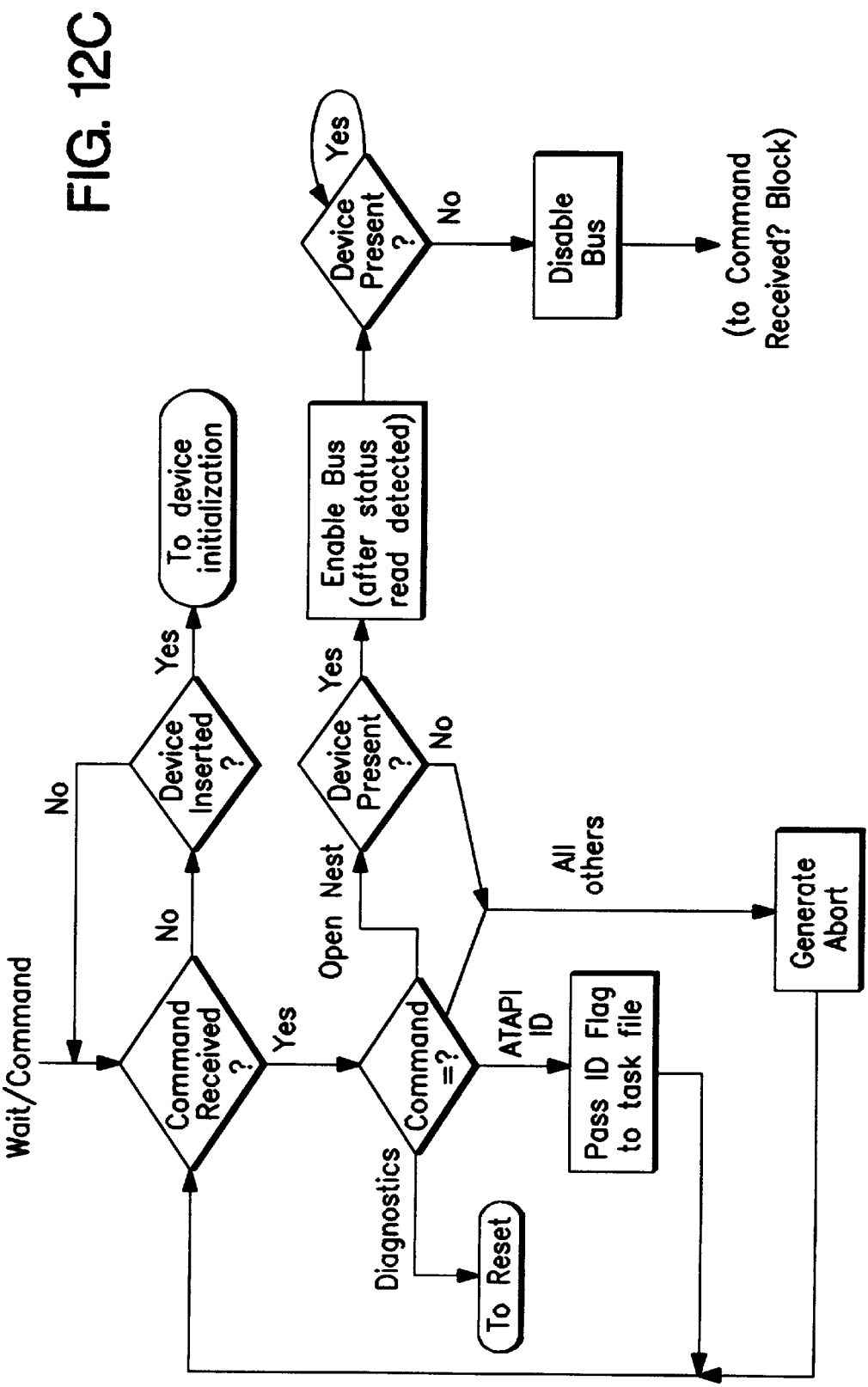

General steps involved with the operation of Nest 30 in conjunction with computer system 200 are ascertained from the foregoing discussion, which is primarily from the perspective of nest driver 230. More detailed aspects of the operation of Nest 30 are understood with reference to the state diagrams FIG. 12A, FIG. 12B, and FIG. 12C. FIG. 12A shows states subsequent to device reset. FIG. 12B shows states involved with device initialization and states after initialization. FIG. 12C shows states involving and subsequent to a Wait/Command state. Removal of device 40 causes assumption of the Wait/Command state. Identify and diagnostic commands are then immediately processed.

Figure 13:
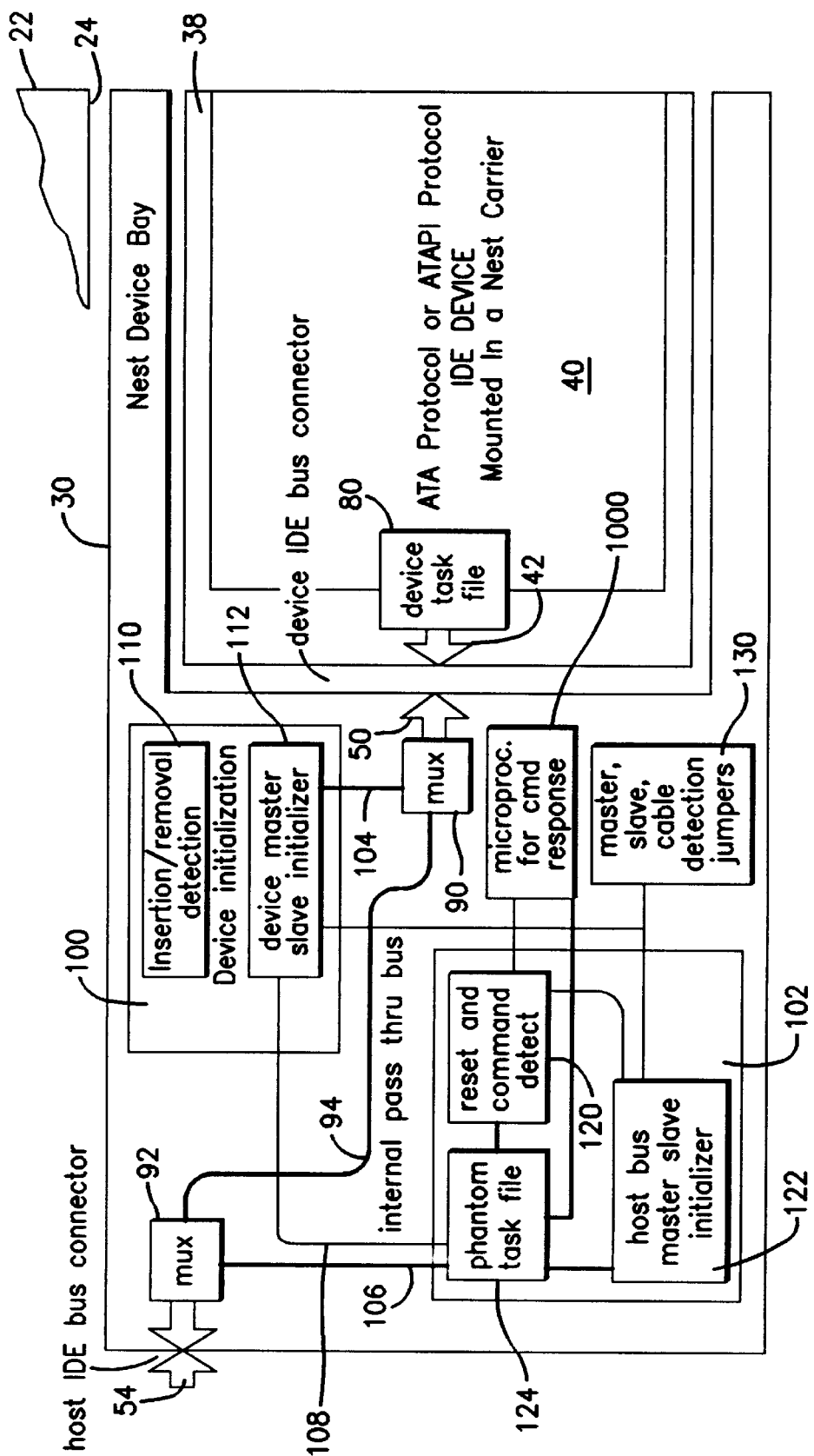
FIG. 13 is a schematic view of an interfacing device (Nest) according to another embodiment of the present invention.

FIG. 13 shows another embodiment of an interfacing device according to the present invention, particularly Nest 30'. Nest 30' of FIG. 13 differs from Nest 30 of FIG. 2 primarily by including an on-board microprocessor 1000. Other elements of Nest 30' which are common to those of Nest 30 are similarly numbered in FIG. 13.

Microprocessor 1000 of Nest 30' executes code which is able to provide a comprehensive set of ATAPI command responses to a host system. In particular, microprocessor 1000 is able to respond to the following standard ATAPI commands: ATAPI Identify; Inquiry; Request Sense; and Test unit Ready. These commands are defined in the Small Form Factor Committee document "ATA Packet Interface for CD-ROMs SFF-8020i. In addition, microprocessor 1000 is able to respond to the OpenNest command described above with respect to step 912 of FIG. 9.

Nest 30' of FIG. 13 is particularly advantageous for installation on the primary and secondary IDE buses 60A and 60B of FIG. 6. The advantages relate to the fact that devices on IDE buses 60A and 60B, unlike those on buses 60C and 60D, must respond to ATAPI commands such as those mentioned in the preceding paragraph prior to execution of nest driver 230. Microprocessor 1000 of Nest 30' thus serves e.g., the function of responding to e.g., these early ATAPI commands. It is known by the person skilled in the art how to instruct microprocessor 1000 to respond to such commands.

While the invention has been particularly shown and described with reference to the preferred embodiments thereof, it will be understood by those skilled in the art that various alterations in form and detail may be made therein without departing from the spirit and scope of the invention. For example, commands other than the OpenNest command can be utilized to establish connection of a device to the IDE bus 60, such as a Mode Select command if mode pages are supported. Similarly, device information can be returned to the host in response to commands other than the IDE "Identify Device" command, such as the Request Sense command or a Mode Sense command if mode pages are supported. Moreover, with respect to embodiments such as that illustrated in FIG. 6, Nest 30 can be either in the master or slave position, and two Nests 30 can be simultaneously on the same bus.

The embodiments of the invention in which an exclusive property or privilege is claimed are defined as follows:

1. An interface apparatus which fits into a peripheral slot of a host computer, the host computer having an IDE bus, the interface apparatus comprising:

an interface frame having an internal bay which accommodates an IDE device, the interface frame being insertable into the peripheral slot of the host computer;

an interface circuit which performs IDE communication with the host computer over the IDE bus when no IDE device is in the internal bay, the interface circuit also serving, while the IDE bus is active and while the IDE device is being inserted into the internal bay of the interface frame, to keep the IDE device isolated from the IDE bus until such time as connection of the IDE device to the IDE bus will not corrupt the IDE bus, after which time the circuit connects the IDE device to the IDE bus while the IDE bus is active;

wherein the interface circuit emulates a sequence of events that occur on the IDE bus for the IDE device that is inserted into the internal bay, and subsequently establishes a current state of the IDE bus in the IDE device.

2. The apparatus of claim 1, wherein the interface circuit keeps the IDE device isolated from the IDE bus until the IDE device has completed its own initialization.

3. The apparatus of claim 1, wherein the interface circuit is mounted on the interface frame.

4. The apparatus of claim 1, wherein the interface circuit comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

5. The apparatus of claim 1, wherein the interface circuit further comprises an initializer for initializing a master/slave status of the IDE device.

6. The apparatus of claim 1, wherein the interface circuit emulates an IDE device when no IDE device is in the internal bay.

7. A computer system comprising:

a microprocessor;

an IDE adapter connected to the microprocessor;

an IDE bus connected between the IDE adapter;

an interface apparatus connected to the IDE bus which performs IDE communication with the microprocessor over the IDE bus when no IDE device is connected to the interface apparatus, and when the interface apparatus has the IDE device connected thereto while the IDE bus is active, the interface apparatus keeps the IDE device isolated from the IDE bus while the IDE bus is active until such time as connection of the IDE device to the IDE bus will not corrupt the IDE bus, after which time the interface apparatus connects the newly connected IDE device to the IDE bus while the IDE bus is active;

wherein the interface circuit emulates a sequence of events that occur on the IDE bus for the IDE device that is inserted into the internal bay, and subsequently establishes a current state of the IDE bus in the IDE device.

8. The computer system of claim 7, wherein the interface apparatus keeps the IDE device isolated from the IDE bus until the IDE device has completed its own initialization.

9. The computer system of claim 7, wherein the interface apparatus further comprises an initializer for initializing a master/slave status of the IDE device.

10. The apparatus of claim 7, wherein the interface apparatus emulates an IDE device when no IDE device is connected to the interface apparatus.

11. A computer system comprising:

a microprocessor;

an IDE adapter connected to the microprocessor;

an IDE bus connected between the IDE adapter;

an interface apparatus connected to the IDE bus which performs IDE communication with the microprocessor over the IDE bus when no IDE device is connected to the interface apparatus, and when the interface apparatus has the IDE device connected thereto while the IDE bus is active, the interface apparatus keeps the IDE device isolated from the IDE bus while the IDE bus is active until such time as connection of the IDE device to the IDE bus will not corrupt the IDE bus, after which time the interface apparatus connects the newly connected IDE device to the IDE bus while the IDE bus is active;

wherein the interface apparatus comprises an interface frame having an internal bay which accommodates the IDE device, the interface frame being insertable into a peripheral slot of a housing of the host computer.

12. The computer system of claim 11, wherein the interface apparatus comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

13. A computer system comprising:

a microprocessor;

an IDE adapter connected to the microprocessor;

an IDE bus connected between the IDE adapter;

an interface apparatus connected to the IDE bus and to which an IDE device is connectable while the IDE bus is active, the interface apparatus serving to keep the IDE device isolated from the IDE bus while the IDE bus is active until such time as connection of the IDE device to the IDE bus will not corrupt the IDE bus, after which time the interface apparatus connects the newly connected IDE device to the IDE bus while the IDE bus is active;

wherein the microprocessor maintains a dynamic device database, and wherein the microprocessor executes a driver which causes reenumeration of the database to reflect wherein the microprocessor maintains a dynamic device database, and wherein the microprocessor executes a driver which causes reenumeration of the database to reflect connection or disconnection of the IDE device relative to the interface apparatus while the IDE bus is active.

14. The computer system of claim 13, wherein the driver resides in and is executed in a first ring of an operating system of the microprocessor, wherein the driver schedules execution of at least a portion of the driver in a second ring of the operating system for the purpose of removing, during a time of execution of the second ring, a node of the dynamic device database which is a parent to the IDE device which as been connected or disconnected to the interface apparatus, and wherein the driver requests at least a partial inventory of the computer system during execution of the first ring in order to reenumerate the database.

15. An interface apparatus which fits into a peripheral slot of a host computer, the host computer having an IDE bus, the interface apparatus comprising:

an interface frame having an internal bay which accommodates an IDE device, the interface frame being insertable into the peripheral slot of the host computer;

an interface circuit which, while the IDE bus is active and while the IDE device is being inserted into the internal bay of the interface frame, keeps the IDE device isolated from the IDE bus until a predetermined electrical condition of the IDE device is sensed;

wherein the predetermined electrical condition of the IDE device is sensed by sensing a predetermined signal issued by the IDE device.

16. The apparatus of claim 15, wherein the interface circuit is mounted on the interface frame.

17. The apparatus of claim 15, wherein the interface circuit comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

18. The apparatus of claim 15, wherein the interface circuit further comprises an initializer for initializing a master/slave status of the IDE device.

19. An interface apparatus which fits into a peripheral slot of a host computer, the host computer having an IDE bus, the interface apparatus comprising:

an interface frame having an internal bay which accommodates an IDE device, the interface frame being insertable into the peripheral slot of the host computer;

an interface circuit which, while the IDE bus is active and while the IDE device is being inserted into the internal bay of the interface frame, keeps the IDE device isolated from the IDE bus until a predetermined electrical condition of the IDE device is sensed;

wherein the predetermined electrical condition of the IDE device is sensed by reading a task file of the IDE device.

20. The apparatus of claim 19, wherein the interface circuit is mounted on the interface frame.

21. The apparatus of claim 19, wherein the interface circuit comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

22. The apparatus of claim 19, wherein the interface circuit further comprises an initializer for initializing a master/slave status of the IDE device.

23. An interface apparatus which fits into a peripheral slot of a host computer, the host computer having an IDE bus, the interface apparatus comprising:

an interface frame having an internal bay which accommodates an IDE device, the interface frame being insertable into the peripheral slot of the host computer;

an interface circuit which, while the IDE bus is active and while the IDE device is being inserted into the internal bay of the interface frame, keeps the IDE device isolated from the IDE bus until a predetermined electrical condition of the IDE device is sensed;

wherein the predetermined electrical condition of the IDE device is that the IDE device has completed its own initialization.

24. The apparatus of claim 23, wherein the interface circuit is mounted on the interface frame.

25. The apparatus of claim 23, wherein the interface circuit comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

26. The apparatus of claim 23, wherein the interface circuit further comprises an initializer for initializing a master/slave status of the IDE device.

27. A computer system comprising:

a microprocessor;

an IDE adapter connected to the microprocessor;

an IDE bus connected between the IDE adapter;

an interface apparatus connected to the IDE bus and to which an IDE device is connectable while the IDE bus is active, the interface device keeping the IDE device isolated from the IDE bus until a predetermined electrical condition of the IDE device is sensed;

wherein the predetermined electrical condition of the IDE device is sensed by sensing a predetermined signal issued by the IDE device.

28. The apparatus of claim 27, wherein the interface apparatus comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

29. The apparatus of claim 27, wherein the interface apparatus further comprises an initializer for initializing a master/slave status of the IDE device.

30. A computer system comprising:

a microprocessor;

an IDE adapter connected to the microprocessor;

an IDE bus connected between the IDE adapter;

an interface apparatus connected to the IDE bus and to which an IDE device is connectable while the IDE bus is active, the interface device keeping the IDE device isolated from the IDE bus until a predetermined electrical condition of the IDE device is sensed;

wherein the predetermined electrical condition of the IDE device is sensed by reading a task file of the IDE device.

31. The apparatus of claim 30, wherein the interface apparatus comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

32. The apparatus of claim 30, wherein the interface apparatus further comprises an initializer for initializing a master/slave status of the IDE device.

33. A computer system comprising:

a microprocessor;

an IDE adapter connected to the microprocessor;

an IDE bus connected between the IDE adapter;

an interface apparatus connected to the IDE bus and to which an IDE device is connectable while the IDE bus is active, the interface device keeping the IDE device isolated from the IDE bus until a predetermined electrical condition of the IDE device is sensed;

wherein the predetermined electrical condition of the IDE device is that the IDE device has completed its own initialization.

34. The apparatus of claim 33, wherein the interface apparatus comprises:

an insertion/removal detector which detects whether the IDE device is inserted into the bay of the interface frame;

a gate which selectively connects the IDE bus with the IDE device;

a set of registers for storing information indicative of a current state of the IDE bus; and means for transferring the contents of the set of registers to the IDE device when the IDE bus is connected to the IDE device.

35. The apparatus of claim 33, wherein the interface apparatus further comprises an initializer for initializing a master/slave status of the IDE device.

36. A computer system comprising:

a microprocessor;

an IDE bus connected to the microprocessor;

an interface apparatus connected to the IDE bus and to which an IDE device is connectable while the IDE bus is active;

wherein the microprocessor maintains a dynamic device database and wherein the microprocessor causes reenumeration of the database to reflect connection or disconnection of the IDE device relative to the interface apparatus while the IDE bus is active;

wherein the microprocessor executes a driver which causes the reenumeration of the database.

37. The computer system of claim 36, wherein the driver resides in and is executed in a first ring of an operating system of the microprocessor, wherein the driver schedules execution of at least a portion of the driver in a second ring of the operating system for the purpose of removing, during a time of execution of the second ring, a node of the dynamic device database which is a parent to the IDE device which as been connected or disconnected to the interface apparatus, and wherein the driver requests at least a partial inventory of the computer system during execution of the first ring in order to reenumerate the database.

* * * * *